(12) United States Patent
Ho et al.

(10) Patent No.: US 8,533,286 B2
(45) Date of Patent: *Sep. 10, 2013

(54) METHOD AND APPARATUS FOR AGGREGATING USER DATA AND PROVIDING RECOMMENDATIONS

(75) Inventors: Edwin Ho, Palo Alto, CA (US); King Sun Wai, Castro Valley, CA (US)

(73) Assignee: MSpot, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,404

(22) Filed: Apr. 30, 2011

(65) Prior Publication Data

US 2011/0208831 A1    Aug. 25, 2011

Related U.S. Application Data

(63) Continuation of application No. 12/761,313, filed on Apr. 15, 2010, now Pat. No. 7,937,451, which is a continuation-in-part of application No. 12/355,546, filed on Jan. 16, 2009, now Pat. No. 7,865,572, and a continuation-in-part of application No. 11/788,711, filed on Apr. 20, 2007, now Pat. No. 7,865,571.

(60) Provisional application No. 61/040,131, filed on Mar. 27, 2008, provisional application No. 60/879,416, filed on Jan. 8, 2007.

(51) Int. Cl.
*G06F 15/16* (2006.01)

(52) U.S. Cl.
USPC ........ 709/217; 709/231; 709/233; 455/552.1; 455/556.1

(58) Field of Classification Search
USPC ................ 455/414.1, 418, 419, 552.1, 556.1, 455/557; 709/217, 231, 233
See application file for complete search history.

(56) References Cited

U.S. PATENT DOCUMENTS

| | | | |
|---|---|---|---|
| 6,493,758 B1 | 12/2002 | McLain | |
| 6,507,727 B1 | 1/2003 | Henrick | |
| 6,795,859 B2 | 9/2004 | Parker | |
| 6,810,080 B1 | 10/2004 | Wise | |
| 7,065,342 B1 | 6/2006 | Rolf | |
| 7,136,934 B2 | 11/2006 | Carter et al. | |
| 7,191,193 B2 | 3/2007 | Ben-Yaacov et al. | |
| 7,281,034 B1 | 10/2007 | Eyal | |
| 7,370,063 B2 | 5/2008 | Vilcauskas et al. | |

(Continued)

FOREIGN PATENT DOCUMENTS

| | | |
|---|---|---|
| JP | 2001297263 | 10/2001 |
| JP | 2003-284029 | 3/2003 |

(Continued)

OTHER PUBLICATIONS

EP 08 70 5466 Supplementary European Search Report dated Feb. 25, 2010.

(Continued)

*Primary Examiner* — Temica M Beamer
(74) *Attorney, Agent, or Firm* — Kenneth L. Sherman, Esq.; Michael Zarrabian, Esq.; Sherman & Zarrabian LLP

(57) ABSTRACT

A method and system for aggregating user data and providing recommendations for digital content or in conjunction with a social network is disclosed.

20 Claims, 25 Drawing Sheets

(56) References Cited

U.S. PATENT DOCUMENTS

| | | | |
|---|---|---|---|
| 7,403,769 B2 | 7/2008 | Kopra et al. | |
| 7,523,136 B2 | 4/2009 | Toorn | |
| 2002/0002039 A1 | 1/2002 | Qureshey et al. | |
| 2005/0015467 A1 | 1/2005 | Noda | |
| 2005/0044235 A1 | 2/2005 | Balahura et al. | |
| 2006/0008180 A1 | 1/2006 | Wakeland | |
| 2006/0143297 A1 | 6/2006 | Korhonen et al. | |
| 2006/0156365 A1 | 7/2006 | Zhang et al. | |
| 2006/0173974 A1 | 8/2006 | Tang | |
| 2006/0206565 A1 | 9/2006 | Ganesan | |
| 2006/0288847 A1 | 12/2006 | Gould et al. | |
| 2008/0010372 A1 | 1/2008 | Khedouri | |
| 2008/0022005 A1 | 1/2008 | Wu et al. | |
| 2008/0052371 A1* | 2/2008 | Partovi et al. | 709/217 |
| 2010/0269146 A1 | 10/2010 | Britt | |

FOREIGN PATENT DOCUMENTS

| | | |
|---|---|---|
| JP | 2003-510734 | 3/2003 |
| JP | 2003284029 A | 3/2003 |
| JP | 2003510734 A | 3/2003 |
| JP | 2004054914 | 2/2004 |
| JP | 2007164653 | 6/2007 |
| WO | WO01/24474 A1 | 4/2001 |
| WO | WO 2004/061547 A2 | 7/2004 |
| WO | WO 2005/064945 | 7/2005 |
| WO | WO 2005/106876 A2 | 11/2005 |
| WO | WO 2005/109224 | 11/2005 |
| WO | WO 2006/019608 A1 | 2/2006 |
| WO | WO 2006/058149 A2 | 6/2006 |
| WO | WO 2008/070062 A2 | 6/2008 |

OTHER PUBLICATIONS

EP 08 70 5466 Office Action dated Jun. 10, 2010.
PCT/US08/00055, International Search Report, dated Apr. 10, 2008.
PCT/US08/00055, Written Opinion, dated Apr. 10, 2008.
PCT/US2009/038457 International Search Report, dated May 27, 2009.
PCT/US2009/038457 Written Opinion, dated May 27, 2009.
PCT/US2009/038457 Supplementary Search Report, dated Apr. 7, 2011.
Office Action in corresponding Chinese Patent Application 200880007398.4 dated Jun. 9, 2011.
Office Action in corresponding Japanese Patent Application 2009-545565 dated Jul. 27, 2011.
Office Action in corresponding EP Patent Application 08705466.4 dated May 13, 2011.
Examiner's Report dated Nov. 20, 2012 for Japanese Application No. 2009545565 from Japan Patent Office, pp. 1-7, Tokyo, Japan (English-language translation included, pp. 1-4).
Chinese Office Action dated Nov. 23, 2012 for Chinese Application No. 200880007398.4 from Chinese Patent Office, pp. 1-17, Beijing, China (English-language translation included, pp. 1-14).
Korean Office Action dated Dec. 10, 2012 for Korean Application No. 2010-7024131 from Korean Intellectual Property Office, pp. 1-8, Seo-gu, Daejeon, 302-701, Republic of Korea (English-language translation included, pp. 5-8).
International Preliminary Report on Patentability dated Dec. 20, 2012 for International Application No. PCT/US2011/032372 from International Bureau of WIPO, pp. 1-6, Geneva, Switzerland.
Korean Notice of Preliminary Rejection dated May 31, 2012 for Korean Application No. 2010-7024131 from Korean Intellectual Property Office, pp. 1-5, Seo-gu, Daejeon, 302-701, Republic of Korea (English-language translation included, pp. 6-9).
European Office Action dated Mar. 21, 2012 for European Application No. 09725812.3 from European Patent Office, pp. 1-5, Rijswijk, Netherlands.
Chinese Office Action dated Jun. 5, 2012 for Chinese Application No. 200880007398.4 from Chinese Patent Office, pp. 1-7, Beijing, China (English-language translation included, pp. 8-19).
U.S. Non-Final Office Action mailed Dec. 15, 2009 for U.S. Appl. No. 11/788,711.
U.S. Final Office Action mailed Apr. 30, 2010 for U.S. Appl. No. 11/788,711.
U.S. Non-Final Office Action mailed Aug. 5, 2010 for U.S. Appl. No. 11/788,711.
U.S. Notice of Allowance mailed Nov. 1, 2010 for U.S. Appl. No. 11/788,711.
U.S. Non-Final Office Action mailed Apr. 5, 2010 for U.S. Appl. No. 12/355,546.
U.S. Non-Final Office Action mailed Aug. 5, 2010 for U.S. Appl. No. 12/355,546.
U.S. Notice of Allowance mailed Nov. 1, 2010 for U.S. Appl. No. 12/355,546.
U.S. Non-Final Office Action mailed Aug. 6, 2010 for U.S. Appl. No. 12/761,313.
U.S. Notice of Allowance mailed Dec. 27, 2010 for U.S. Appl. No. 12/761,313.
U.S. Non-Final Office Action mailed Mar. 4, 2011 for U.S. Appl. No. 12/981,476.
U.S. Notice of Allowance mailed Aug. 22, 2011 for U.S. Appl. No. 12/981,476.
U.S. Notice of Allowance mailed Oct. 6, 2011 for U.S. Appl. No. 12/981,476.
U.S. Non-Final Office Action mailed Mar. 8, 2011 for U.S. Appl. No. 12/981,479.
U.S. Non-Final Office Action mailed Sep. 2, 2011 for U.S. Appl. No. 12/981,479.
U.S. Notice of Allowance mailed Apr. 2, 2012 for U.S. Appl. No. 12/981,479.
U.S. Non-Final Office Action mailed Feb. 6, 2012 for U.S. Appl. No. 13/332,196.
U.S. Non-Final Office Action mailed Oct. 12, 2012 for U.S. Appl. No. 13/332,196.
Japanese Office Action dated Dec. 13, 2012 for Japanese Application No. 2011502073 from Japanese Patent Office, pp. 1-3, Japan (English-language translation included, pp. 1-3).
Examiners Report dated Feb. 25, 2013 for Canadian Application No. 2,677,181 from Canadian Intellectual Property Office, pp. 1-5, Ontario, Canada.
U.S. Final Office Action for U.S. Appl. No. 13/332,196 mailed Mar. 21, 2013.
Notification of Grant of Patent Right for Invention dated Jun. 21, 2013 for Chinese Application No. 200880007398.4 from Chinese Intellectual Property Office, pp. 1-2, Beijing, China (English language translation p. 1).

* cited by examiner

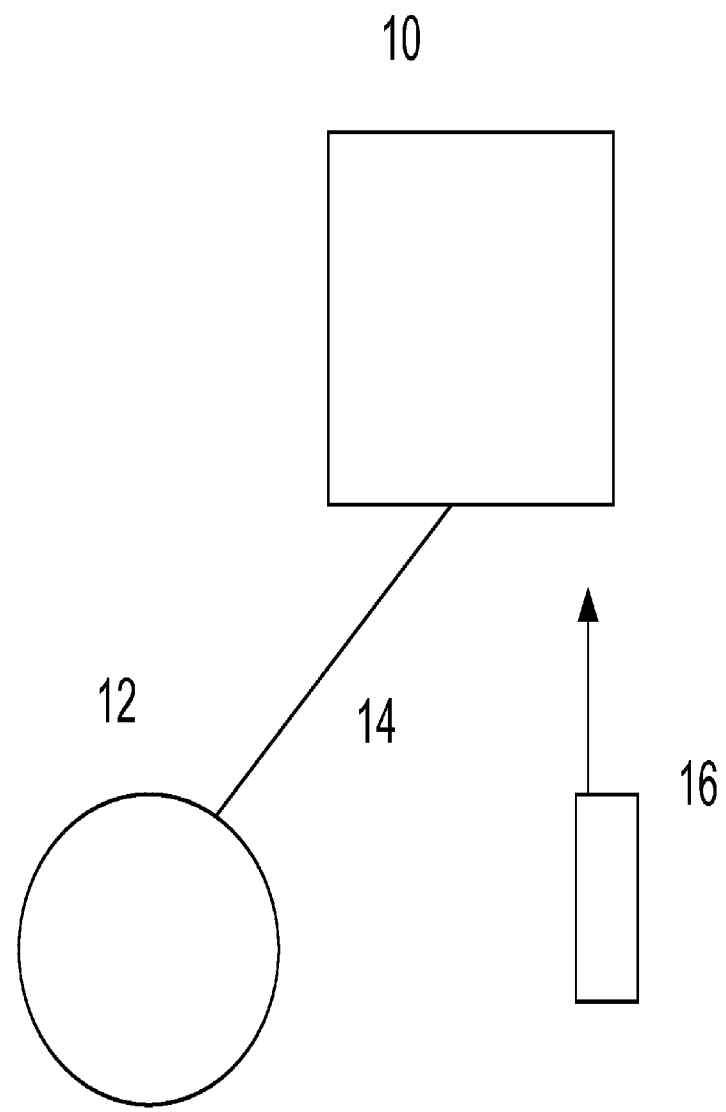
Figure 1: Prior Art

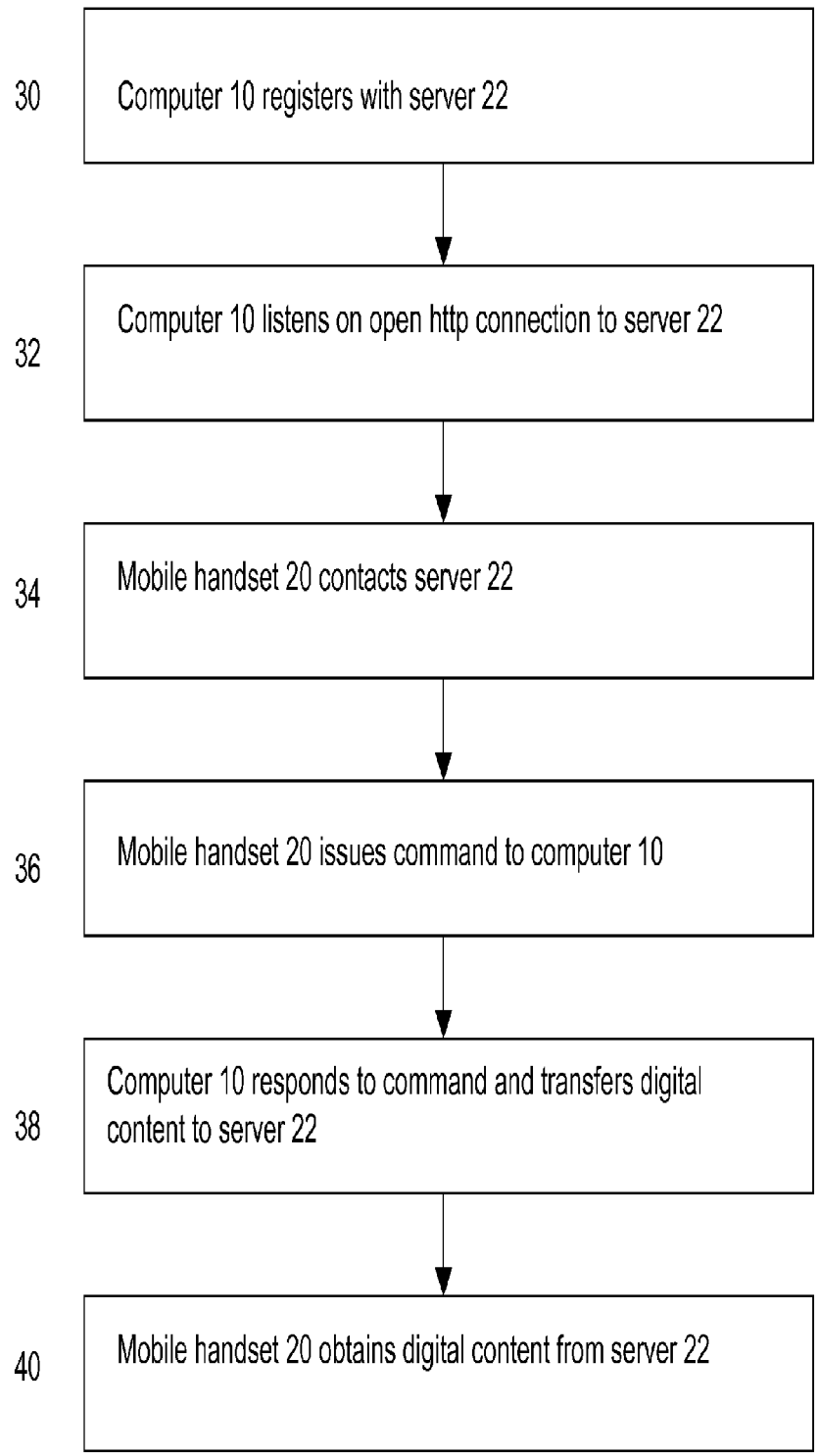

METHOD AND APPARATUS FOR AGGREGATING USER DATA AND PROVIDING RECOMMENDATIONS

PRIORITY CLAIM

This application claims priority under 35 USC 120 and is a continuation of U.S. patent application Ser. No. 12/761,313, filed on Apr. 15, 2010 and titled "Method and Apparatus for Transferring Digital Content From a Computer to a Mobile Handset," which is a continuation-in-part of U.S. patent application Ser. No. 12/355,546 now U.S. Pat. No. 7,865,572, filed on Jan. 16, 2009 and titled "Method and Apparatus for Transferring Digital Content From a Computer to a Mobile Handset," which in turn claims the benefit under 35 USC 119(e) to U.S. Provisional Patent Application Ser. No. 61/040,131, filed on Mar. 27, 2008, which in turn is a continuation-in-part and claims priority under 35 USC 120 to U.S. patent application Ser. No. 11/788,711 now U.S. Pat. No. 7,865,571 filed on Apr. 20, 2007 and titled "Method And Apparatus For Transferring Digital Content From A Personal Computer To A Mobile Handset" which in turn claims priority under 35 USC 119(e) and 120 to U.S. Provisional Patent Application Ser. No. 60/879,416 filed on Jan. 8, 2007, all of which are incorporated by reference herein.

FIELD

The invention relates generally to a method and apparatus for aggregating user data and providing recommendations for digital content or in conjunction with a social network.

BACKGROUND

With the increase in storage capacity of hard disk drives and the prevalence of optical CD and DVD drives, users now can store their entire musical libraries on their personal computer (PC). For example, various software programs such as iTunes (offered by Apple Computer) allow a user to load musical content from CDs, store it on the computer's hard disk drive, organize the different content, and then play the music on the PC or burn all or part of the musical collection onto a CD or DVD. Users also can transfer the musical files to other devices, such as an iPod (offered by Apple Computer) or an MP3 player. These transfers typically require a direct, hardwired connection between the PC and the device, such as through a USB cable.

In recent years, mobile handsets (such as cellular phones and PDAs) have evolved beyond mere telephone and data collection devices. For example, many cellular phones now have sophisticated display screens and audio capabilities. Various companies (including mSpot, Inc., the assignee of this application), offer audio and video content that is "streamed" to the cellular phone using a wireless cellular network. This allows cellular phone users to listen to music or other audio content and watch movies or other video content on their cellular phones. However, the user's choices are limited to the content offered by the provider. What is needed in the art is a system that allows a user of a mobile handset to obtain digital content that he or she previously had stored on a personal computer or other device by downloading the content over a wireless network and to store it on the mobile handset.

In addition, today's systems offer fragmented digital content services that require a user to go to different web-sites, different devices or different services to be able to gain access to their digital content, such as Internet radio, music collections, news, local radio and full track music for example. Thus, it is desirable to provide a system that can store all of the different types of digital content in one location and allow the user to access the digital content and it is to this end that the disclosure is directed.

In addition, with the vast volume of digital content that is stored and potentially can be stored in a computing cloud, it is desirable to provide recommendations to users who access the computing cloud to assist them in finding digital content that is correlated with their personal preferences and patterns. It would also be desirable for the recommendations to be based at least in part on the preferences and patterns of members of a user's social network.

BRIEF DESCRIPTION OF THE DRAWINGS

FIG. 1 is a block diagram of the prior art system involving a PC and an audio device such as an iPod or MP3 player and/or a portable storage device;

FIG. 3 is a flowchart showing a method for downloading music from a PC to a mobile handset;

DETAILED DESCRIPTION OF ONE OR MORE EMBODIMENTS

FIG. 1 depicts the prior art system in which a user stores digital content (such as music, video, etc.) on computer 10. Computer 10 can be a desktop, notebook, server, or any other type of device that can store digital data. User connects portable entertainment device 12 to computer 10 using interface 14. Portable entertainment device 12 can be an iPod, MP3 player, or any other device that can store and play digital content. Interface 14 is a direct connection between computer 10 and portable entertainment device 12 and typically is a USB cable or Firewire cable.

In the alternative, a user can connect portable storage device 16 to computer 10 to download the digital data, and then disconnect portable storage device 16 from computer 10 and then connect portable storage device 16 to portable entertainment device 12 to download the data onto portable entertainment device 12. Portable storage device 16 can be a Flash ROM chip, a hard disk drive, or other storage device.

Figure 2A:
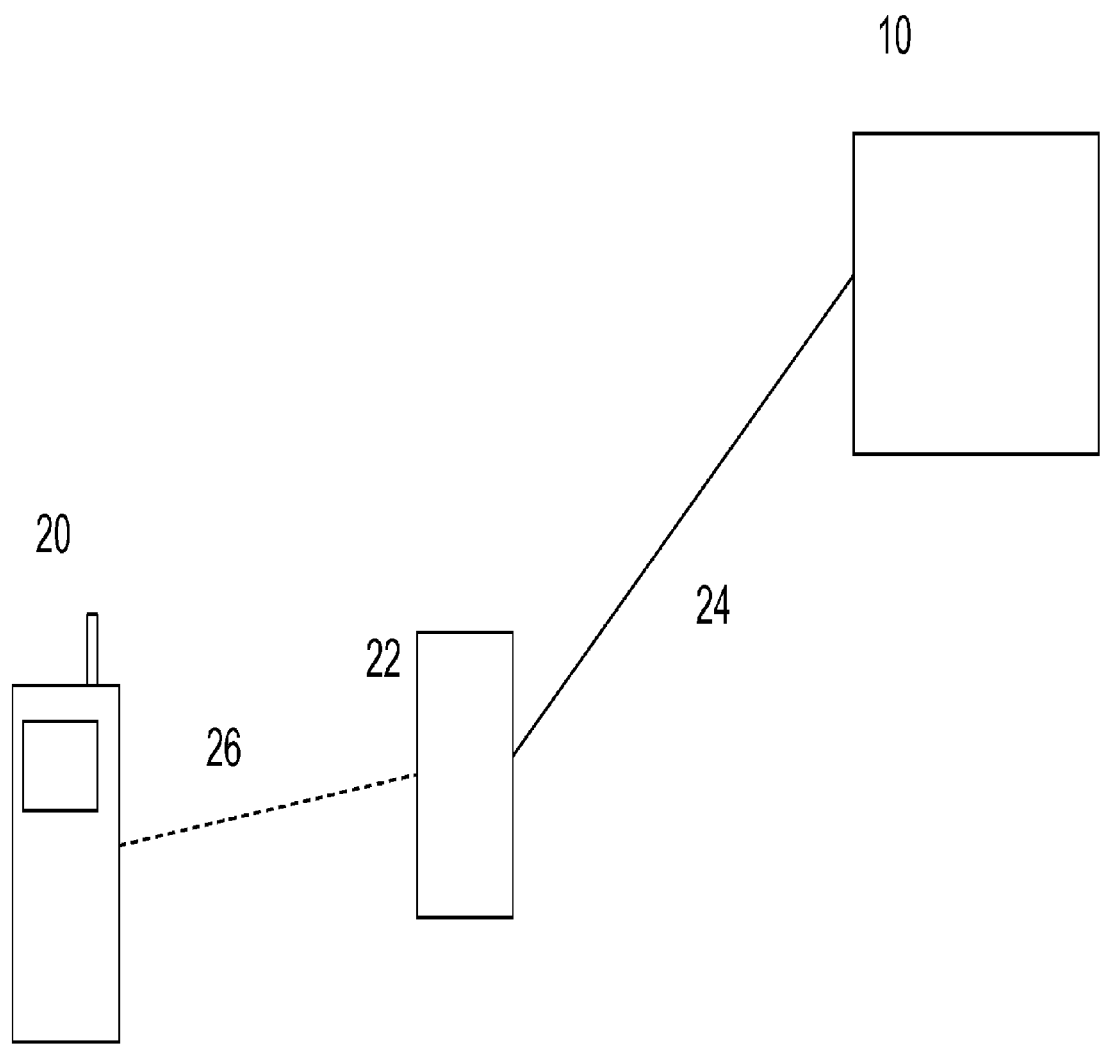
FIG. 2A illustrates a first embodiment of a system that allows a device to download music from a computing device using a wireless network and the Internet.

FIG. 2A depicts a first embodiment of a system that allows a mobile handset to download digital content from a computer using a wireless network. As in the prior art, a user stores digital content (such as photos, music, videos, Internet radio, news, local radio, podcasts, etc.) on a computing-based system 10. However, in this embodiment, the user downloads the digital data from computer 10 to a device 20 in a wireless fashion over a wireless communication path. Device 20 may be a PDA, mobile phone, wireless email device (such as the Blackberry), or other handheld device that has wireless connectivity to be able to communicate with the computer 10 and download digital content from the computer 10. Computer 10 communicates with a device 22, such as a server computer, over network 24. Network 24 can be any type of network, such as the Internet, and can be hardwired, wireless, or some combination of the two. Computer 10 runs a software application that allows a user to catalog and organize the digital content of the user. The device 22 can be accessible over the Internet (such as through a URL address). The device 22 is shown in FIG. 2 as a single device. However, it is to be understood that the device 22 can instead comprise multiple devices, such as multiple servers.

Device 20 connects to device 22 over a wireless network 26. Wireless network 26 can be a cellular telephone network, a WiFi network (such as an 802.11 network), a wireless data network (such as EV-DO, EDGE, 3G or LTE), WiMAX, a broadband network or any other wireless network. It is to be understood that wireless network 26 need not connect directly to server device 22, but instead can connect through an indirect means such as by the Internet or through another network. The embodiment will be further described with reference to FIG. 3.

Figure 2B:
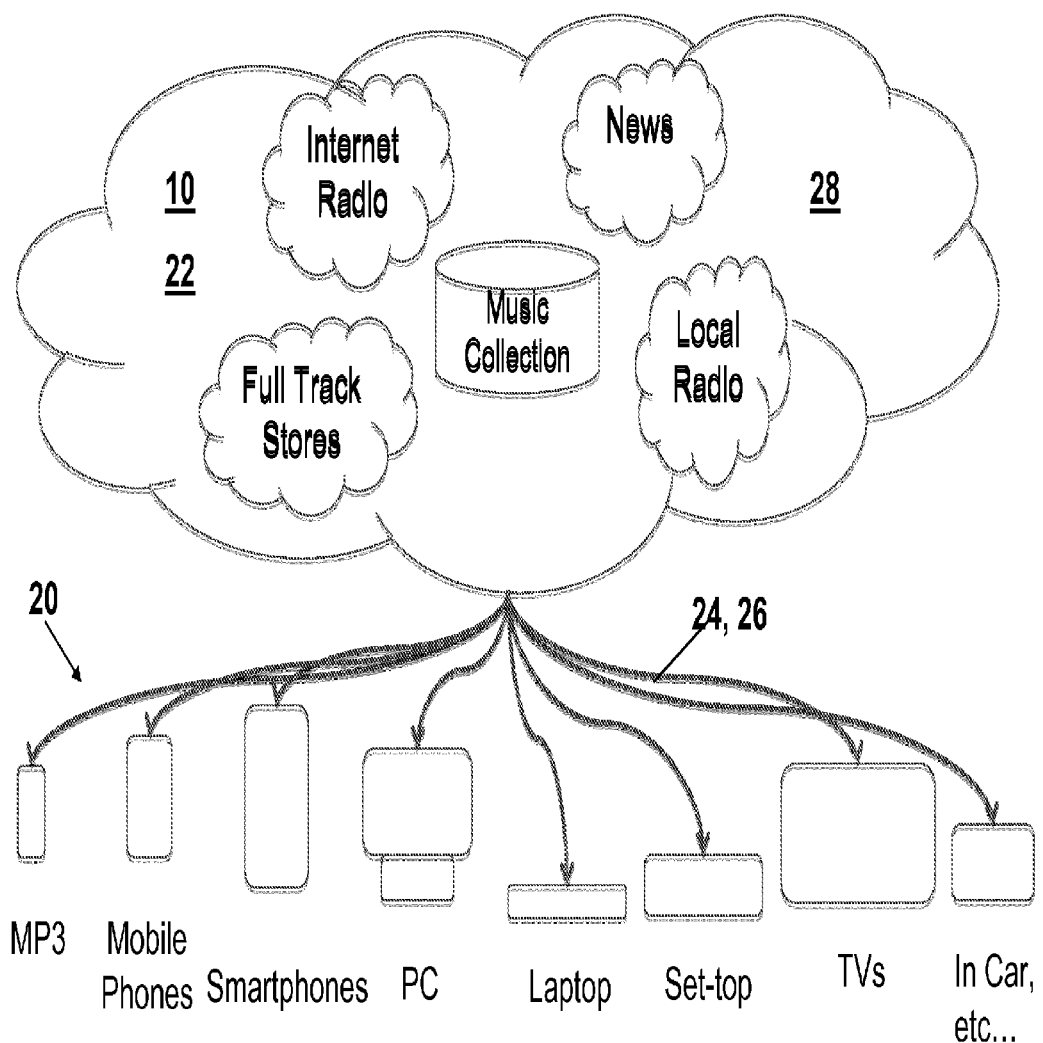
FIG. 2B illustrates a second embodiment of a system that allows a device to download music from a computing device using a wireless network and the Internet.

FIG. 2B illustrates a second embodiment of a system that allows a device 20 to download digital content from a computing device 28 using a wireless network and the Internet 24, 26. In this embodiment, the computing device 28 may be a computing cloud (with a plurality of processing unit based devices, storage devices, etc.) that allows a user to store their digital content in a digital content store for the user. Thus, in this embodiment, the computing device may include the computer 10 and the device 22 described above. As shown, the cloud may store the various digital content, such as photos, ringtones, Internet radio, full track stores, music collections, news and local radio, in a store associated with the user so that access to the digital content of the user is limited to the user and other authorized people and devices 20. Thus, the user can connect to the cloud to interact with their digital content that is no longer siloed on a particular device or in a particular location. In this embodiment, each device 20 may be a processing unit based device with sufficient processing power, memory and connectivity, such as an MP3 player, smart phones, mobile phones personal computer, laptop, set-top box, television, in car digital content system or game consoles, to interact with the computing device 28 and play/display/interact with the digital content using the application described below. Each device may also have a digital content store that may be implemented in software and stored in the memory of the device. The system may also use various applications/access devices/application to access the digital content on the computing device 28 since the digital content can be accessed using typical browser applications, facebook or other applications or proprietary mobile device applications and browsers.

In this embodiment, each device 20 may include an plug-in/application/plurality of lines of code that is downloaded/stored on the device 20, stored in the memory of the device and executed by the processor of the device wherein the plug-in/application/plurality of lines of code, among other things, implements a digital content user interface on each device as described below in more detail. Each plug-in/application/plurality of lines of code on each device may also automatically in the background (passive sync) or when a low cost network is available, transfer all of the digital content on the device up to the computing device 28 to provide for the intelligence upload of the digital content. The plug-in/application/plurality of lines of code on each device may also actively sync the digital content (an active process that syncs the digital content), batch sync the digital content (synchronize a group of pieces of digital content at a predetermined time, periodically or when a particular link is available) or a priority sync.

In the priority sync, the pieces of digital content for each user are prioritized and then synchronized between the device(s) and the content store based on the priorities. The priorities can be determined based on manual prioritization or automatic prioritization (based on storage size limits or scoring of the digital content) or a combination of manual and automatic prioritization. The automatic prioritization can be manually overridden by the user. Manual prioritization allows the user to designate certain pieces of digital content so that those pieces of digital content are synched first. In one implementation, all manual prioritized digital content is synched before other digital content. The storage size limits prioritization may prioritize the digital content for synching based on the overall size of the digital content in the collection of the user, the size of the digital content store in the cloud of the user and/or the storage size of a particular device 20. The scoring of the digital content may use one or more different metrics, such as for example the number of times a piece of digital content has been played, whether a piece of digital content appears on a playlist, whether or not the piece of digital content was recently added/purchased by the user, the popularity of the piece of digital content, etc.) to rank each piece of digital content and sync the digital content based on the rankings When the manual and automatic prioritization are used together, the content system may, for example, include all manually prioritized digital content, and then include as much of the automatically prioritized digital content for the storage size available (on the cloud/computer or on the device) unless the user has overridden the automatically prioritized digital content.

Figure 26:
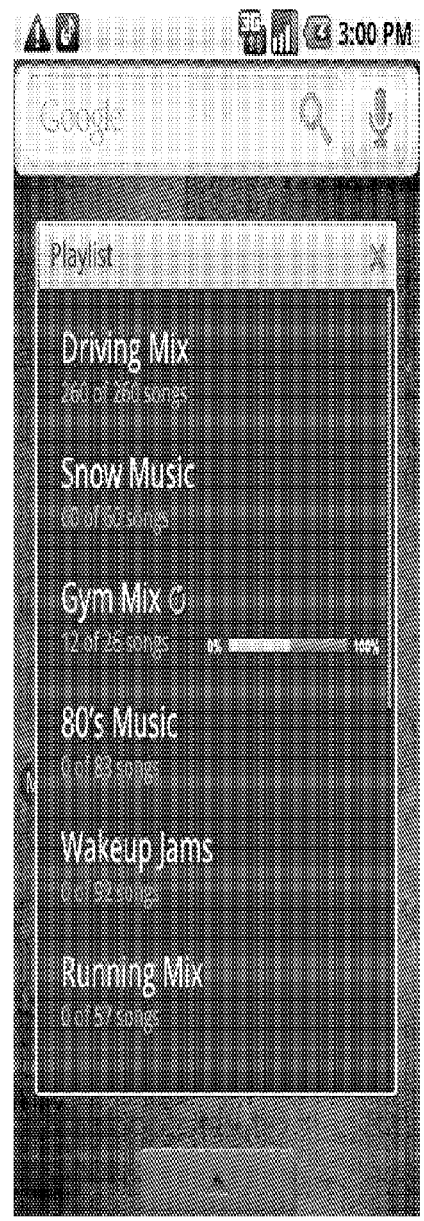
FIG. 26 illustrates an example of live folders of the digital content system on a particular device.

At all times, each plug-in/application/plurality of lines of code on each device 20 may have a list of the digital content of the user (which may be just the content on the device or all of the content of the user), but the actual digital content filed may be stored in the computing device 28. The plug-in/application/plurality of lines of code on each device 20 may also include a digital content replacement process to ensure that each device has sufficient memory space to store the newest downloaded digital content. The replacement strategy may be a least recently used strategy (where the least recently used digital content is deleted), a least recently played strategy and the like. In addition, for certain devices 20 that allow multiple executive threads (such as devices using the Android operating system, for example), the plug-in/application/plurality of lines of code may incorporate a background process that synchronizes the digital content list to the device without user involvement. FIG. 26 illustrates an example of a user interface of this type of device that provides live folders and background synching.

In the embodiment shown in FIG. 2B, the content store in the cloud 28 or computer 10 may store digital content for each household member/member of the group that owns the digital content. Then, each user or each device 20 may select some portion or all of the entire digital content store for the group to synchronize to the device 20 of the user. For example, in a family with a father, a daughter aged 12 and a son aged 16 who share the digital content store in the cloud 28, the father, daughter and son may have different musical tastes, for example, and therefore each of the father, daughter and son may synchronize (using playlists, etc.) a subset of the entire digital content store to their personal device. The owner of a particular content store in the cloud 28 or computer 10 may also be allowed to authorize one or more additional devices 20 (up to N devices) to synchronize with the content store such as to allow a new device to use the digital content in the content store.

In addition to the downloading and exchanging of the digital content between the device 20 and the computer 10, the second embodiment of the system also allows a user to directly transfer digital content between the various devices 20 using a wired or wireless connection. In one implementation, the computing device 28 may include a manager unit (that may be implemented in software on a server computer that is part of the overall computing device 28) that manages the device 20 to device direct transfer of digital content (authentication, protocols, etc.) and the devices 20 interact with the manager unit. In another implementation, the plug-in/application/plurality of lines of code each device may include lines of code to implement the direct transfer of digital content since each device is aware of its neighbors of certain networks, such as LANs, and can thus initiate a transfer of the digital content. The device to device transfer may occur over a hardwire link, such as a USB cable or a LAN, a wireless link, such as Bluetooth, Wifi or 3G, or using a hardware device, such as an SD card. The system may select the fastest link available when transferring the digital content. The device to device transfer may be controlled/managed by a computer of the content system. For example, the computer of the content system may determine the identifier of each device that wants to participate in the direct transfer, authenticate that each device is authorized to synchronize with the content store and then allow the direct transfer if both device are authenticated. The computer or each device may determine the appropriate link over which to exchange the digital content.

The synching of digital content directly between devices as well as the synching between the computer/cloud 10, 28 can be managed in a number of ways. For example, the synching can always operate over the lowest cost network available to reduce the data costs. For the device 20 that is plugged into a power source, synching can be done in the background since the synching will not drain the battery of the device whereas a device operating on battery power may deactivate background synching or slow down the synching even if a fast network is available to prevent battery drain. On a computer 10, the content system may throttle the synching based on the other usage of the computer by the user. For example, when the screen saver is active (meaning no use by the user), the synching may go as fast as possible whereas when the computer is being used by the user for other activities, the synching process may be reduced so that the synching does not interfere with the overall operation of the computer.

FIG. 3 is a flowchart depicting the interaction of the various elements shown in FIG. 2. Computer 10 connects to device 22 over network 24. Computer 10 then registers with device 22 (30) so that device 22 associates the digital content in the computer 10 with a particular user and a particular mobile handset. Computer 10 then listens on an open http connection to device 22 (32) and waits for communications from server device 22. Mobile handset 20 contacts server device 22 (34) over wireless network 26. Once the computer 10 is registered with the device 22, the user of the mobile handset, when the handset is turned on, sees the digital content actually stored on the mobile handset as well as the digital content stored in the computer 10 in a single display as shown in more detail in FIG. 4. When the user of the mobile handset wants to use a piece of digital content stored on the computer 10, the mobile handset 20 issues a command to computer 10 (36), such as a command to transfer a certain piece of digital content. Computer 10 responds to the command and transfers the digital content to device 22 (38). Mobile handset 20 then obtains digital content from device 22 (step 40). Thus, mobile handset 20 is able to obtain digital content (such as a music file) from computer 10 in a fashion that is at least partly wireless. Using the above system and method, a user may have digital content stored on his/her computer as well as on the mobile handset and may synchronize the digital content between the computer and the mobile handset in a wireless manner. For example, the system permits a user to have a much larger digital content catalog available for use than can be stored in the mobile handset. In addition, the system permits the user to download particular digital content at any time, such as downloading a particular movie before a long airplane flight. The user also can download additional data associated with the digital content, such as metadata (artist information, duration, title, etc.), cover art, and other data.

Figure 4:
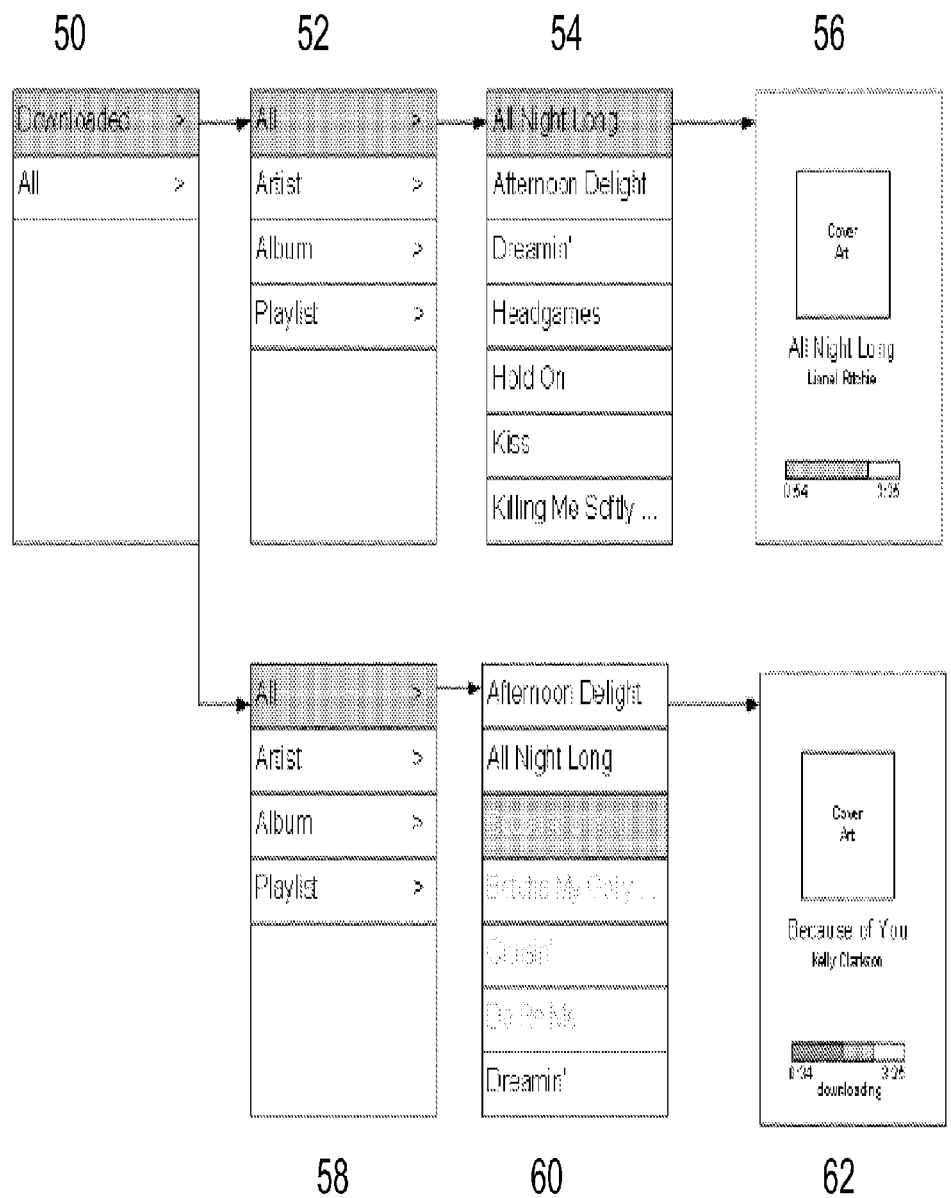
FIG. 4 shows an example of a user interface on the mobile handset for downloading music from a PC to the mobile handset.

FIG. 4 shows an embodiment of a user interface for mobile handset 20 once the computer 10 is registered with the device 22. FIG. 4 shows a number of different screens that might be displayed on mobile handset 20. These screens are generated by a software application running on mobile handset 20. The software application on the mobile handset obtains (when the digital content is not already stored in the mobile handset), organizes, displays (both digital content on the mobile handset and the computer 10), stores and plays digital content and can generate the user interface described below.

Screen 50 provides the user with two choices—to view a list of files that have been downloaded from computer 10 ("Downloaded") and are stored on the mobile handset, or to view a list of all files ("All") including the digital content stored on the mobile handset and the digital content stored on the computer 10. If the user selects the "Downloaded" option, then in screen 52, the user can then choose a subset of the files (by artist, album, or playlist) or to view all of them. If the user selects "All," then mobile handset 20 displays all available music files, including files that have been or can be downloaded from computer 10. In this embodiment, song titles in normal, black text already have been downloaded to mobile handset 20, and song titles in gray text have not yet been downloaded but can be downloaded. In Screen 54, the user selects the song "All Night Long," which already has been downloaded, and in Screen 56, the song plays on mobile handset 20 while cover art and other relevant information is displayed for the song "All Night Long."

When the user selects the "All" option in screen 50, the user is presented with a menu (58) that permits the user with options to view all of the digital content (both stored on the mobile handset and stored on the computer) including "All", by Artist, by Album and/or by Playlist. When the user selects to view all of the digital content (which are songs in this example), a screen 60 shows all of the digital content (both on the mobile handset and on the computer) wherein certain pieces of digital content are shown in gray text indicating that those pieces of digital content are stored on the computer and are available for download to the mobile handset and other pieces of digital content are shown in black indicating that those pieces of digital content are stored on the mobile handset. If the user selects "Because of You" (which is shown in gray text), mobile handset 20 then issues a command to computer 10 (36), such as a command to transfer the song "Because of You" from the computer to the mobile handset. Computer 10 responds to the command and transfers the requested digital content to server device 22 (38) and the mobile handset 20 then obtains the digital content from server device 22 (40). Once the piece of digital content (or at least a buffer full of the piece of digital content as the piece of digital content continues to download in the background) is downloaded to the mobile handset, screen 62 then shows the cover art and other relevant information for the song "Because of You" as the song is being played. When the digital content is downloaded onto mobile handset 20, it is played on mobile handset 20 and is also stored in a storage system within mobile handset 20 (such as on Flash RAM chip or disk drive) while it is being played. The digital content (a song in the example in FIG. 4) is thus added to the music collection stored on mobile handset 20. When that song is displayed in a menu in the future, it will be displayed in normal, black text rather than gray text since it has now been downloaded and stored on mobile handset 20.

In this manner, the digital content on mobile handset 20 can be synchronized with the digital content on computer 10 in a wireless fashion. This allows a user to listen to or watch the digital content that is stored on computer 10, even when the user is in a location remote from the computer 10.

Device 22 can implement security or verification measures to ensure that the person operating mobile handset 20 is the same person who owns computer 10, for copyright protection and other reasons. For example, device 22 can require that computer 10, when the computer registers with the device 22, provide device 22 with the phone number for the mobile handset that will be allowed to access the digital content stored on computer 10. When mobile handset 20 then contacts device 22 with a request to obtain data from computer 10, device 22 can then determine if the phone number associated with mobile handset 20 is the same phone number that previously had been registered by computer 10. Device 22 can be designed to proceed with the requested transfer only if the two phone numbers match. Other security or verification measures can be implemented, and this example is only illustrative.

Mobile handset 20 may include circuitry for running an operating system and applications, circuitry for processing data and metadata, and circuitry for rendering and playing the digital content, such as audio content and video content. All of the circuitry can be contained in a single integrated chip, in multiple integrated chips, or in a combination of some number of integrated chips and other electronic components.

A user of mobile handset 20 can run various applications on the handset, such as an application that enables the user to listen to music or to watch video content. Mobile handset 20 can include a video display and a speaker, which would enable a user of mobile handset 20 to watch video content on the video display and listen to audio content through the speaker.

Figure 5:
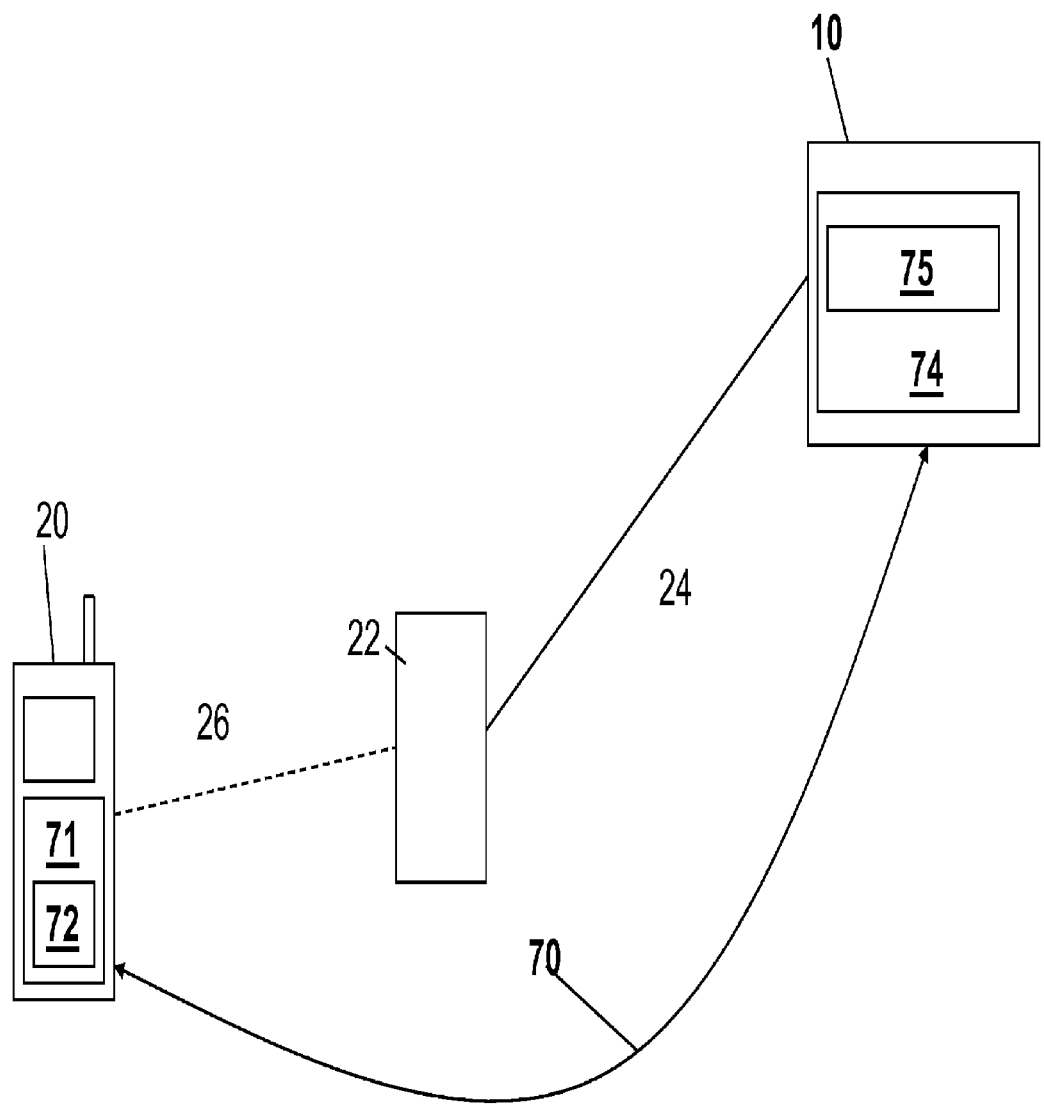
FIG. 5 illustrates another embodiment of the system that allows a mobile handset to share content with a computing device.

FIG. 5 illustrates another embodiment of the system that allows a mobile handset 20 to share content with a computing device 10. In this embodiment, the mobile handset 20 can share content with the computing device 10 through the device 22 (as described above), but may also share content/synchronize content with the computing device 10 over a link 70, such as a cable, a docking station, by removing a memory card from the mobile handset 20 and reading the memory card using a memory card reading device coupled to the computing device 10 or by other wireless protocols such as a Bluetooth network. In this embodiment, the synchronization of the content over the two different methods (through the device 22 and over the link) requires that the system tracks the synchronization by both methods. The system may also permit multiple computing devices and multiple handsets (assuming that the user has the proper authorizations to share the content) to share the content.

The mobile handset may include a content store 71, such as a database, that may include one or more playlists 72 and the computing device 10 may a content store 74, such as a database, and one or more pieces of content 75. In the computing device 10, the one or more pieces of content may have a plurality of different formats (such as MP3, AAC, ACC+, m4a for music content) and the system may be used with multiple different types of content including music content, photo content, file content, video content, podcasts and any other type of digital content. The computing device, using the content store 74, identifies any new content files so that those new content files can appear in the user interface of the mobile handset described above and new files downloaded directed to the mobile handset appear in the master content store maintained on the computing device 10. The content store 71 on each mobile handset may include an identification code (ID) so that the computing device 10 may contain a plurality of content stores for a plurality of mobile handsets wherein the content stores for each mobile handset are distinguished by the identification code. A user can also create a new playlist on the mobile handset that is stored in the content store 71 and then is synchronized back to the computing device 10 so that the computing device also maintains the playlists for the particular mobile handset in the content store for that particular mobile handset as identified by the identification code.

In the system and method described above, the playlists generated on the mobile handset may be an on-the-fly playlist which allows content (both local to the mobile handset and the computing device 10 as well content from any source that can be later pulled down to the mobile handset) to be stored into a playlist on the mobile handset. As above, the on-the-fly playlist may be synchronized back to the computing device 10. In addition, when content stored on the computing device changes (content is removed, for example or the user no longer has rights to play a particular piece of content), the on-the-fly playlist (and other playlists on the mobile handset) are automatically updated to reflect those changes.

Figure 6:
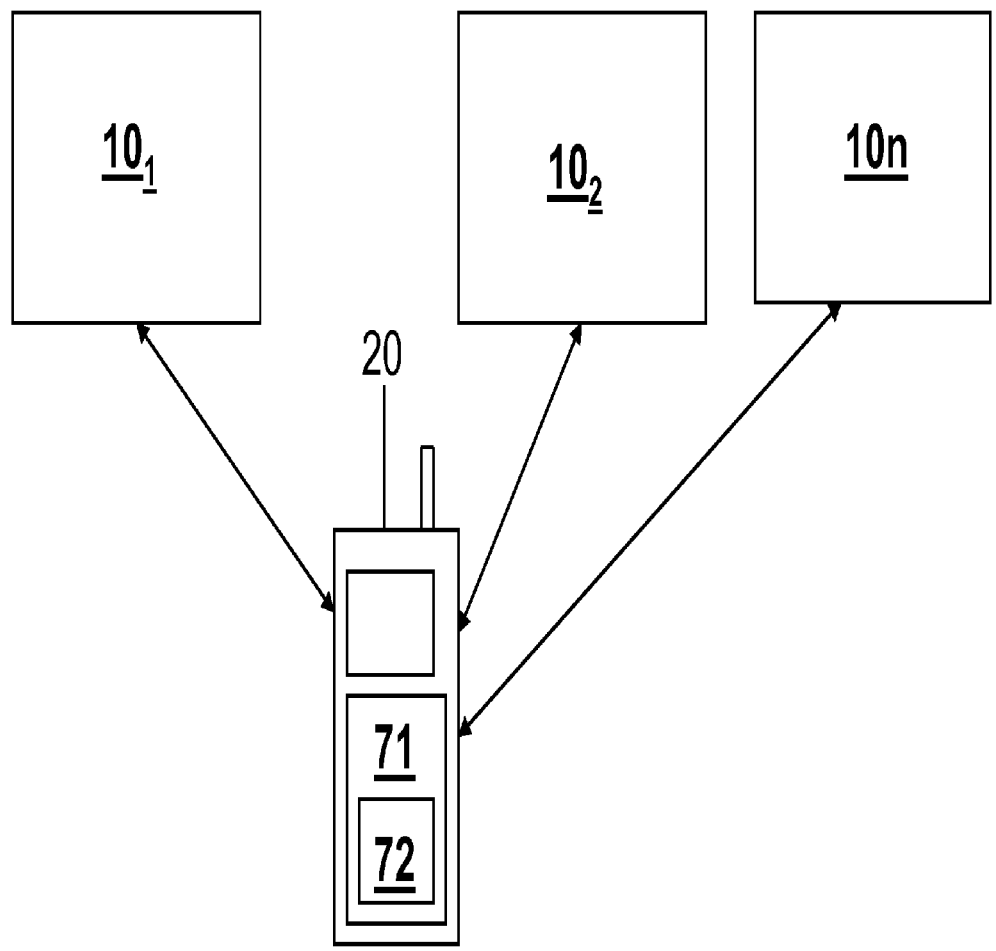
FIG. 6 illustrates another embodiment of the system that allows a mobile handset to share content among a plurality of computing devices.

FIG. 6 illustrates another embodiment of the system that allows a mobile handset 20 to share content among a plurality of computing devices wherein the mobile handset has the content store 71 and playlists 72. As shown, the system permits the mobile handset 20 to synchronize its content with a plurality of computing devices $10_1, 10_2, \ldots, 10n$ and each computing device maintains a content store of the content on the mobile handset. For example, in a family in which the different family members each have their own computing device, the mobile handset of a particular family member can be synchronized to the multiple computing devices so that the content purchased by each member of the family can be shared. Similarly, the system permits multiple mobile handsets to synchronize their content with a single computing device (such as might be the case of a family) or multiple mobile handsets can synchronize their content with multiple computing devices. Thus, the system permits the computing devices to effectively share content between the computing devices.

Figure 7A:
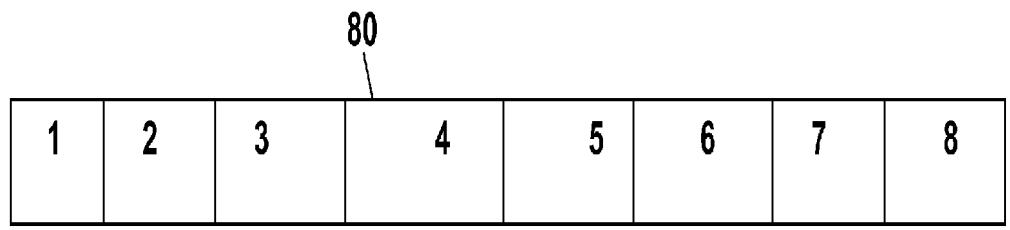
FIG. 7A illustrates a piece of content segmented into smaller pieces.

FIG. 7A illustrates a piece of content 80 segmented into smaller pieces. In most mobile handsets, it is not possible to download an entire piece of content (or the downloading of the entire content causes an unacceptable delay in the user experience) so that the piece of content is segmented into segments, such as segments 1-8, in order to download the segments to mobile handset. For example, the system is able to download the segments in sequential manner and therefore begin to play the piece of content prior to the entire piece of content being downloaded to the mobile handset that provides a better user experience. A mobile handset, depending on the type of mobile handset, may have a progressive download mode. In the progressive download mode, the mobile handset can start the download of the segments and then start to play the content while the remainder of the segments of the content are downloaded to the mobile handset. If the mobile handset is capable of progressive downloading, then the downloading of the content to the mobile handset is straight-forward. However, if the mobile handset does not support progressive downloading (which is the case for most mobile handsets such as mobile phones), a buffering method is used to permit the segmentation of the content and then the downloading of the segments of the content.

Figure 7B:
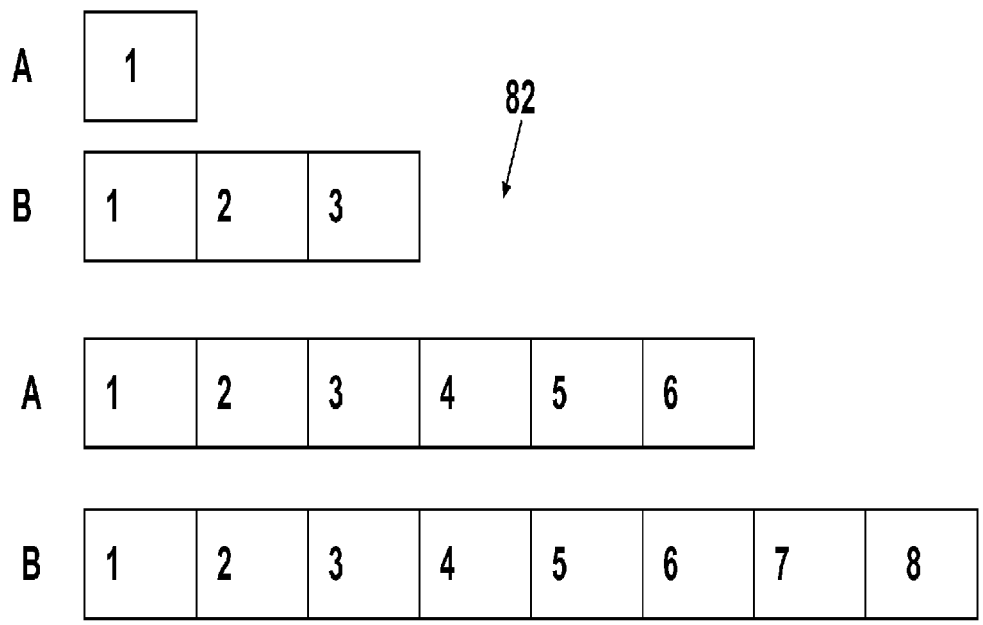
FIG. 7B illustrates a method for downloading content to a mobile device that does not support progressive downloading.

FIG. 7B illustrates a method for downloading/streaming content to a mobile handset that does not support progressive downloading. When the mobile handset does not support progressive downloading, the mobile handset does not permit any download into a buffer while any portion of the content is being played from the buffer. The mobile handset 20 includes the application, as described above, that manages the content on the mobile handset and displays the user interface shown in FIG. 4. In the embodiment in which the mobile handset does not support progressive downloading, the application may also segment a memory space of the mobile handset into a first buffer A and a second buffer B wherein the downloading of the segments of the content occurs by ping-ponging between the first and second buffers. In particular, as shown in FIG. 7B, a new piece of content (having segments 1-8 in this example) has its first segment downloaded into the first buffer and then the segment is played from the first buffer. While the segment of content is being played in the first buffer, the next segments of the piece of content (which must include the first segment to maintain the file integrity and download the file header) of the piece of content is downloaded to the second buffer B (segments 1-3 in this example). Then, when the first segment is completed, the content in the second buffer starting at segment 2 is played. During the switch from the first buffer to the second buffer, a 20 ms silence occurs but it is not noticeable by the user. As the segments of content are being played from the second buffer B, addition segments (segments 4-6 in this example) are downloaded to the first buffer A (along with the prior segments to maintain content file integrity and download the file header). When the playing of the second and third segments is completed, the mobile handset switches back to the first buffer A so that segments 4-6 can be played. While the segments in the first buffer A are being played, the last segments of the piece of content (along with the prior segments to maintain content file integrity) are downloaded into the second buffer and the mobile handset then plays the remaining segments from the second buffer once segments 4-6 are completed so that the mobile handset ping-pongs between the first and second buffers. The use of the two buffers results in a better user experience since the only silence gaps are approximately 20 ms gaps that are not noticeable by the user and permits streaming of the content. Without the two buffers, a mobile handset that does not support progressive downloading: 1) must wait to play the content until it is completely downloaded (which takes too long); or 2) introduces a pause (2 seconds or more) each time that the mobile handset needs to download the next segments of the content. In addition, a mobile handset that does not support progressive downloading and does not have the two buffers cannot be adaptive to bandwidth changes in the network and thus cannot take advantage of good network coverage and good network speed to provide a better user experience.

In another embodiment, the memory space of the mobile handset may be divided into the first and second buffers (as described above) and a third buffer wherein the segments of the content are downloading into the third buffer so that the third buffer has all of the currently downloaded segments of the content (or all of the segments of the content if the downloading is completed).

The mobile handset application may also include a mode in which the application, when the user is playing a playlist for example, looks ahead in the playlist and downloads the next piece of content in the playlist (if it is not already on the mobile handset) in a streaming manner wherein the first piece of content will have the 20 ms silence gaps (due to the streaming and ping-ponging between the buffers), but any subsequent pieces of content will not have the silence gaps since the subsequent content may be pre-downloaded in the entirety to the mobile handset.

The mobile handset/application of the mobile handset may also include an "airplane" mode in which the mobile handset and application determines when the mobile handset is connected to the network (either the wireless network or the link). When the application determines that the mobile handset does not have any connection to the computing device 10, the application does not display any content that is only on the computing device 10, but permits the user to play the content already stored on the mobile handset. However, when the mobile handset is again connected to the computing device 10, the content on the mobile handset and on the computing device (shown in FIG. 4 above) is again shown to the user.

Figure 8:
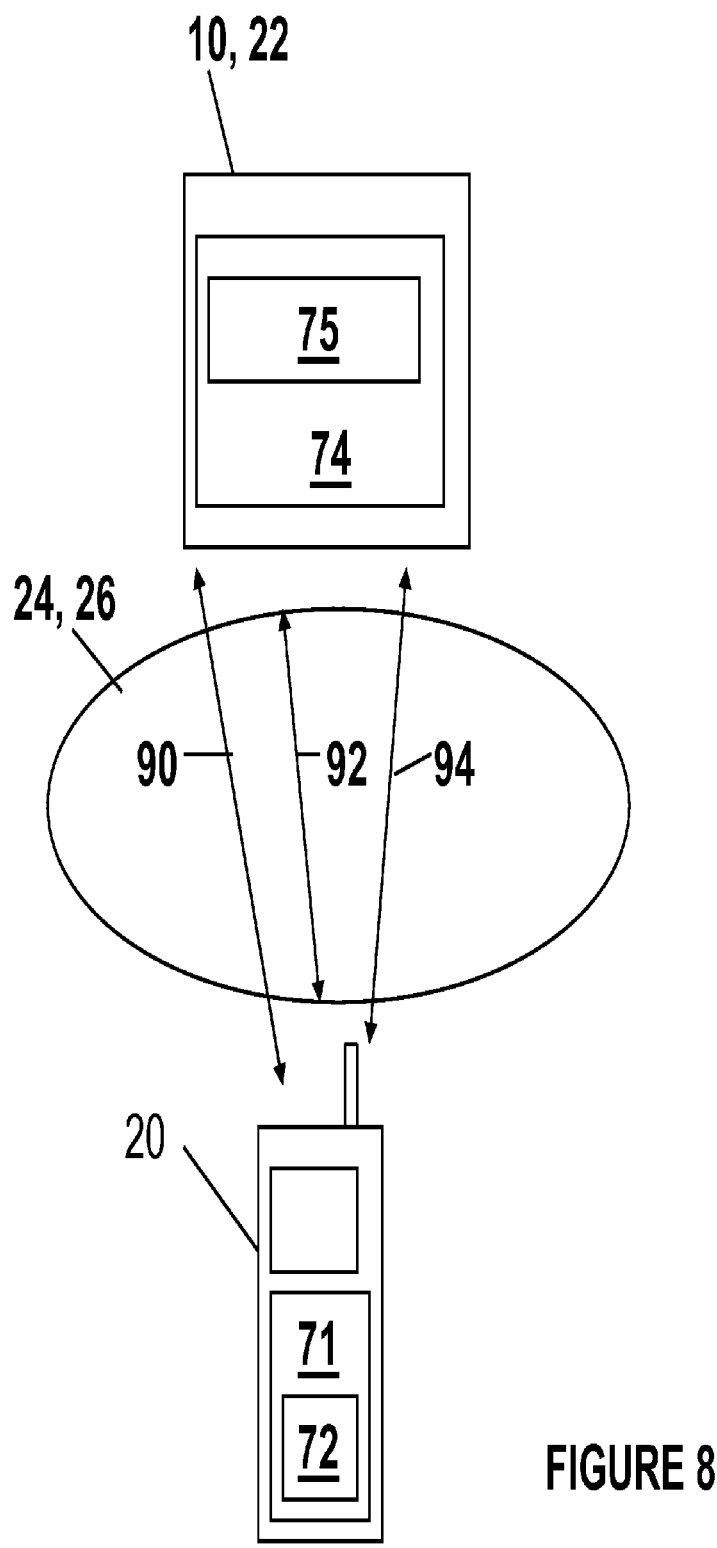
FIG. 8 illustrates a network aware mobile handset application of the content sharing system.

FIG. 8 illustrates a network aware mobile handset application of the content sharing system. As with the system shown in FIG. 5, the mobile handset 20 may include the content store 71, such as a database, that may include one or more playlists 72 and the computing device 10 may the content store 74, such as a database, and one or more pieces of content 75. The mobile handset may further include the content application that is executed on the mobile handset. In this embodiment of the system, the computing device 10 or device 22 may have one or more links 24, 26 that allows the mobile handset 20 to exchange data and information with the computing device 10 or device 22. The link, in this embodiment, may be one or more different links that each have different characteristics. For example, the links may be cellular/mobile or 3G network 90, a wireless computer network 92 and a Bluetooth network 94. Each of these link have different characteristics such as cost to use, bandwidth available and download speed and protocol. For example, a 3G network is expensive, requires a 3G enabled mobile device and has very fast download speeds, a wireless computer network may be free, require a WLAN card or circuit and has a slower download speed as compared to the 3G network.

In the network aware mobile handset application of the content sharing system, the application on the mobile handset has a behavior (when and how its uses each different link when available and how it synchronizes content with the computing device 10 or device 22) that changes based on the particular link that is available and accessible to the mobile handset. For example, the application on the mobile handset may be configured to download any and all content not already on the mobile handset automatically whenever the mobile handset can access a free link and also configured to only download the next piece of content as needed when the mobile handset has access only to an expensive link, such as 3G. As another example, the application on the mobile handset may have a dormancy timer to turn off network access to an expensive link until a button/user action reactivates the link access. As another example, the application on the mobile handset may disable any content prefetch when the mobile handset can only access an expensive link. As another example, if the user has selected to download a movie onto their mobile handset, the application may stream at a minimum speed when the mobile handset has access only to an expensive link, but may then download the entire movie onto the mobile handset when the mobile handset has access to a wireless computer network which is low cost or free. Thus, the application in the mobile handset has behaviors that change depending on the link access of the mobile handset.

In the embodiments described above, the content system may additionally provide digital content data aggregation. In particular, the system may include a unit/device/module that can aggregate data obtained from users when they upload their digital content into the cloud or computer. This data can include web interaction data (data about the user's browsing, etc.), popularity data, other third party data, playlist information, song playback information (e.g., time of last playback, number of times played over past month, etc.), user profile information (e.g., demographic information), metadata for each piece of digital content (e.g., artist name, title of song, cover art, etc.), lyrics, synching information for the lyrics that can be used to display the lyrics in a synchronized fashion with the digital content, and a digital fingerprint for the song (which is a representation of the digital data constituting the song). In addition to data about the digital content from the user, the content system may also gather third party data that can be combined with the user data to enhance the overall user experience of the content system. For example, the system may gather song popularity information that is generated by a third party. The data can be aggregated in a database and can be used as a basis for providing additional services to users. The services may include: recommendations, lyric synching, social networking, digital fingerprinting and others.

Recommendations: Using the data stored for the user (in the cloud or computer), the system may generate recommendations for the user. In particular, the store for the digital content may include playlists from numerous users. These playlists provide a correlation between pieces of digital content, since the songs on that playlist have something in common—for example, the user who created the playlists likes all of those songs, or those songs all fall within the same genre or other category. This correlation information can be used to generate recommendations. For example, if several playlists contain both Song A and Song B, and a particular user has Song A but not Song B, a recommendation engine of the content system can recommend Song B to that user. Furthermore, the recommendations generated by the content system may be based on digital content of other users as described above as well as digital content of the user.

Lyric Synching: In the current art, service providers can offer lyrics with audio or video content for that, for example, the words to a song can be displayed on a mobile device when the song is playing. One constant challenge is to synchronize the lyrics with the words in the song so that the right lyrics appear right when the same words are being sung. Certain applications allow a user to "click" when the next word in the displayed lyrics is sung so that the system can better synchronize itself. Using the content system, all synching information for a given pairing of digital content and lyrics is aggregated by the content system which then performs a normalization process on that pairing to dampen the affect of the "outlier" data, e.g., synchronization information that is significantly different than the average of the synchronization information collected from all users for that pairing. For example, the system may use a deviation process in which line by line synchronization is performed and the standard deviation is determined to remove outlier data which results in better synchronization of the music to the lyrics.

Figure 15:
FIG. 15 illustrates an example of a community user interface of the content system.

Social Networking: The content system may also use the uploaded playlists for each user to assist in social networking For example, the content system can determine that two users have similar musical tastes based on their playlists and then could introduce a user to a different user based on the similarity in musical tastes as determined by analyzing their playlists. The content system would do this introduction because the content system has an API that allows it to interact with various different social networking systems or may have its own social networking/community system. The content system also can be used to recommend music—e.g., once it determines a similarity, it can make recommendations to User A based on User B's playlists, such as "User B listens to Song X but you do not; would you like to try it?" An example of a community user interface of the content system as shown in FIG. 15 wherein the community is within the content system and permits, among other things, personal profiles, connection to social networking sites, such as Facebook, Twitter and MySpace, and the user to share comments and playlists with other members of the community. In addition, the content system may also compare users who have a 90% match in their collections (macro level match) and connect those users to each other.

Digital Fingerprints: Currently, each piece of digital content can be processed to create a digital "fingerprint" for the song, which is a type of unique identifier that is based on the digital content and is useful in ensuring that copyrights are not violated and that appropriate license fees are paid. If users have digital fingerprints for their songs, these fingerprints can be aggregated in a database as well by the content system. These fingerprints can be used for several purposes by the content system. For example, the fingerprints can be used to verify the ID3 tags for a song because, if 80% of all ID3 tags have the same fingerprint, then that fingerprint is likely accurate and those ID3 tags are likely accurate. In one embodiment, the fingerprint can be an ASCII string consisting of up to 16K bits and can be based on the entire piece of digital content and not just a portion of it. The fingerprint of the entire piece of digital content can be used by the system to identify the digital content of other users.

Figure 14:
FIG. 14 illustrates an example of the user interface for on-demand digital content of the content system.

Other: The aggregated data also can be used for other purposes. For example, if a user searches for songs by Artist A, a store of the content system can determine what the five most popular songs by Artist A are (based on the data stored in the database that was collected from users), and it can then show those song in order of popularity among all users represented in the database. The content system also allows a user to search by artist or album and then download (purchase) some/all of the songs for a particular artist or album. An example of a user interface for on-demand digital content of the content system that allows the user to browse and search a library of digital content, play any piece of digital content and add any pieces of digital content to one or more playlists is shown in FIG. 14.

In addition, since the content system may be used to store the digital content for multiple devices 20 of the user as shown in FIGS. 2A and 2B, the digital content lists for each device 20 may be synchronized so that the list of digital content on each device is constantly updated based on the store of digital content in the content system. In addition, when the user buys a new device that has digital content capabilities, the content system may, automatically or on user command, download the digital content list to the new device. The content systems described above also permit two-way synchronization in that digital content (all or a subset) is synchronized from the content store to each device 20 and the digital content on any device 20 may be synchronized back to the content store.

The content system may also provide a playlist creation sub-system in which digital content of the user may be used to seed a new playlist of digital content. Alternatively, a playlist can be generated from a set of recommendations provided to the user. The playlist creation unit may offer a first level of service and an on-demand/interactive level of service. The first level of service may provide playlists generated based on a user's digital content. The on-demand/interactive level of service may provide playlists based on any digital content on a playlist and allow the user to add or delete digital content/playlists.

The content system may also provide streaming download or progressive download to the devices 20 of the digital content instead of the download of the entire piece of digital content. If the device can accommodate progressive download, then progressive download is used. If the device cannot use progressive download, then streaming download is used. Now, examples of the user interface of the content system are described in more detail.

Figure 9:
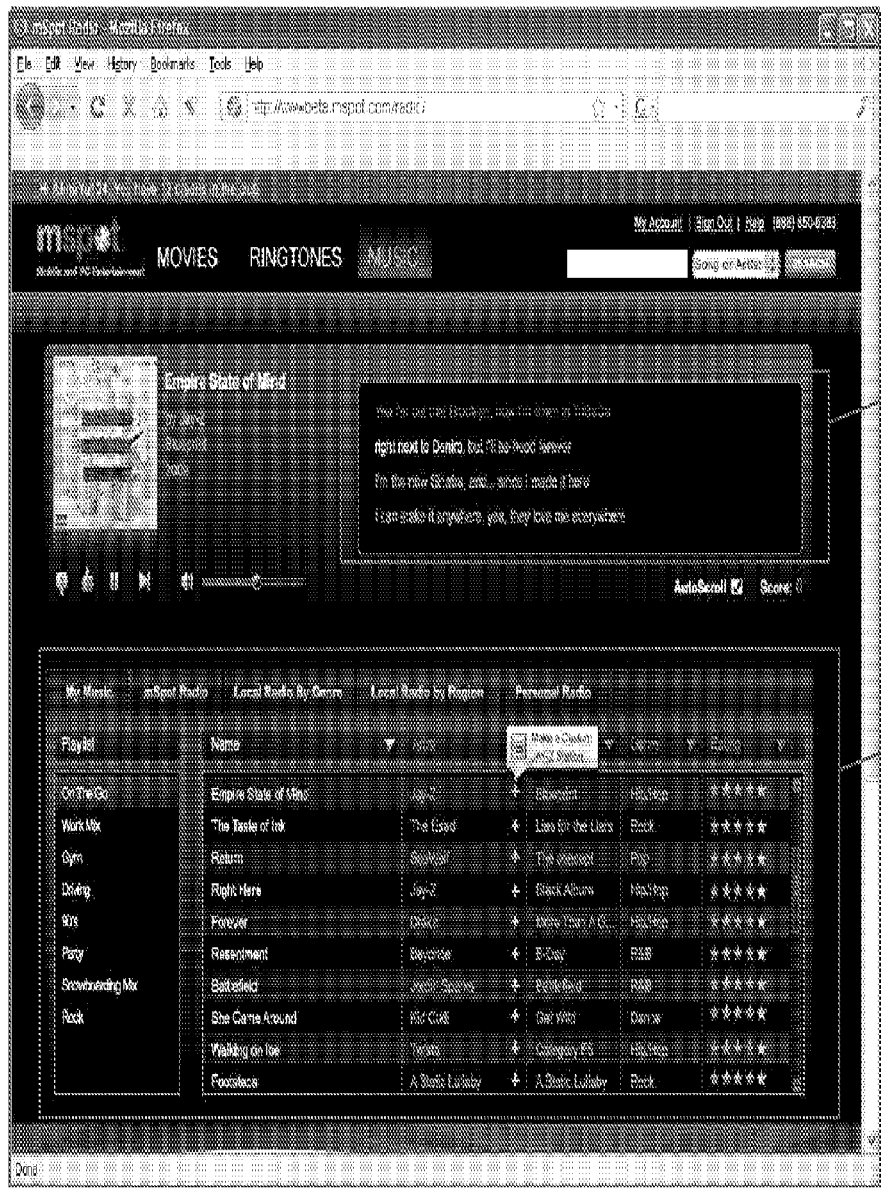
FIG. 9 illustrates an example of a computer interface of the content system that allows synchronization of digital content and adding digital content.

FIG. 9 illustrates an example of a computer interface 100 of the content system that allows synchronization of digital content and adding digital content. This computer interface can be seen by accessing the content system using a computer, for example, As shown in FIG. 9, the system may handle movies, music and ringtones wherein the user interface has tabs that can be chosen by the user to view the pieces of digital content of the user associated with each type of digital content. The user interface also may have a lyric portion 102 that displays the lyrics of the digital content being currently played by the user. The user interface also may have a digital content list portion 104 that shows the digital content, the digital content playlists and the various lists of the different types of digital content which may be selected by tabs in the user interface. Each list of digital content may include the following fields including: a name of the digital content, an artist of the piece of digital content, an album that contains the piece of digital content (for music), a genre assigned to the digital content (if any), and a rating of each piece of digital content (if any).

Figure 10:
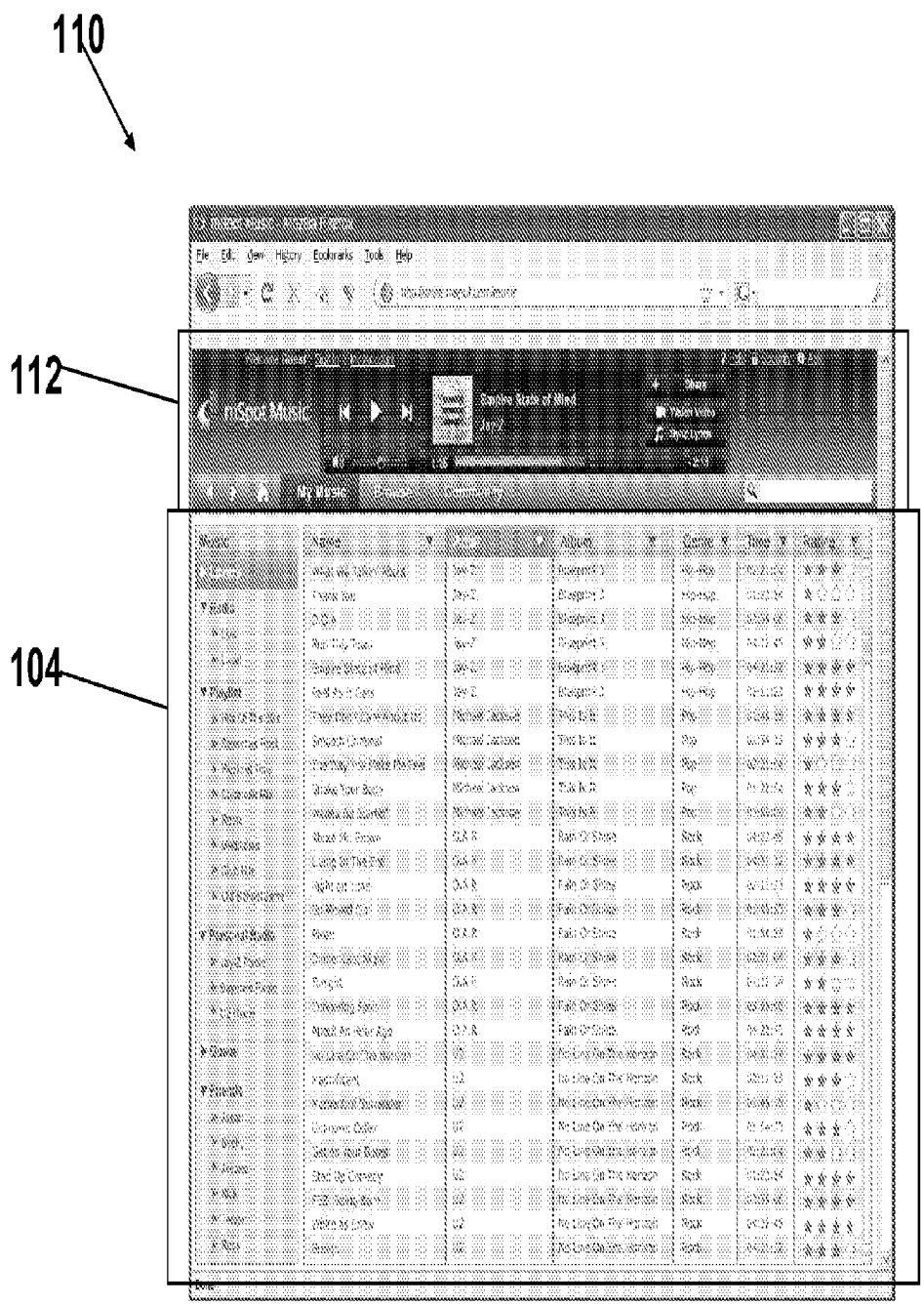
FIG. 10 illustrates an example of a web interface of the content system that allows synchronization of digital content.
Figure 11:
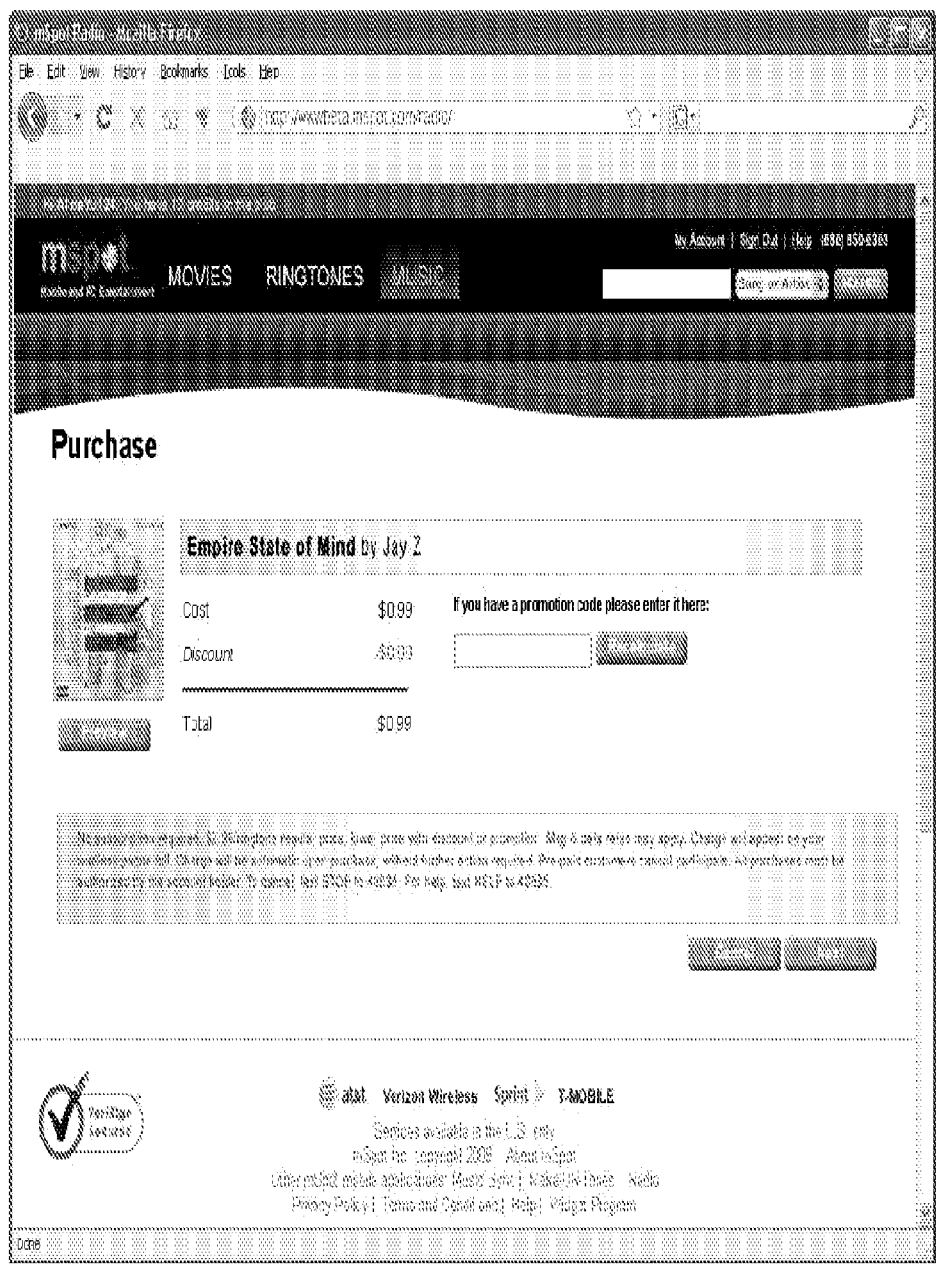
FIG. 11 illustrates an example of a user interface that allows the user to purchase a piece of digital content.
Figure 12:
FIG. 12 illustrates an example of a user interface that allows the user to listen to a personal radio station using the content system.

FIG. 10 illustrates an example of a web interface 110 of the content system that allows synchronization of digital content wherein this illustrates an example of a user interface when the user logs into the content system over the web. As shown, the user interface has the same portion 104 as with the computer user interface and also has a condensed digital content control portion 112 that allows the user to start, stop, play, etc. digital content, share content, watch the video associated with the digital content (for music) and see/sync the lyrics with the digital content (for music). The digital content portion 104 in this user interface also has a time period of the digital content field shown that may also be present in the user interface shown in FIG. 9. For both of the user interfaces of FIGS. 9 and 10, the content system also allows the user to purchase digital content using, for example, the user interface shown in FIG. 11. In addition, the content system allows the user to listed to a personal radio station as shown in FIG. 12.

Figure 13:
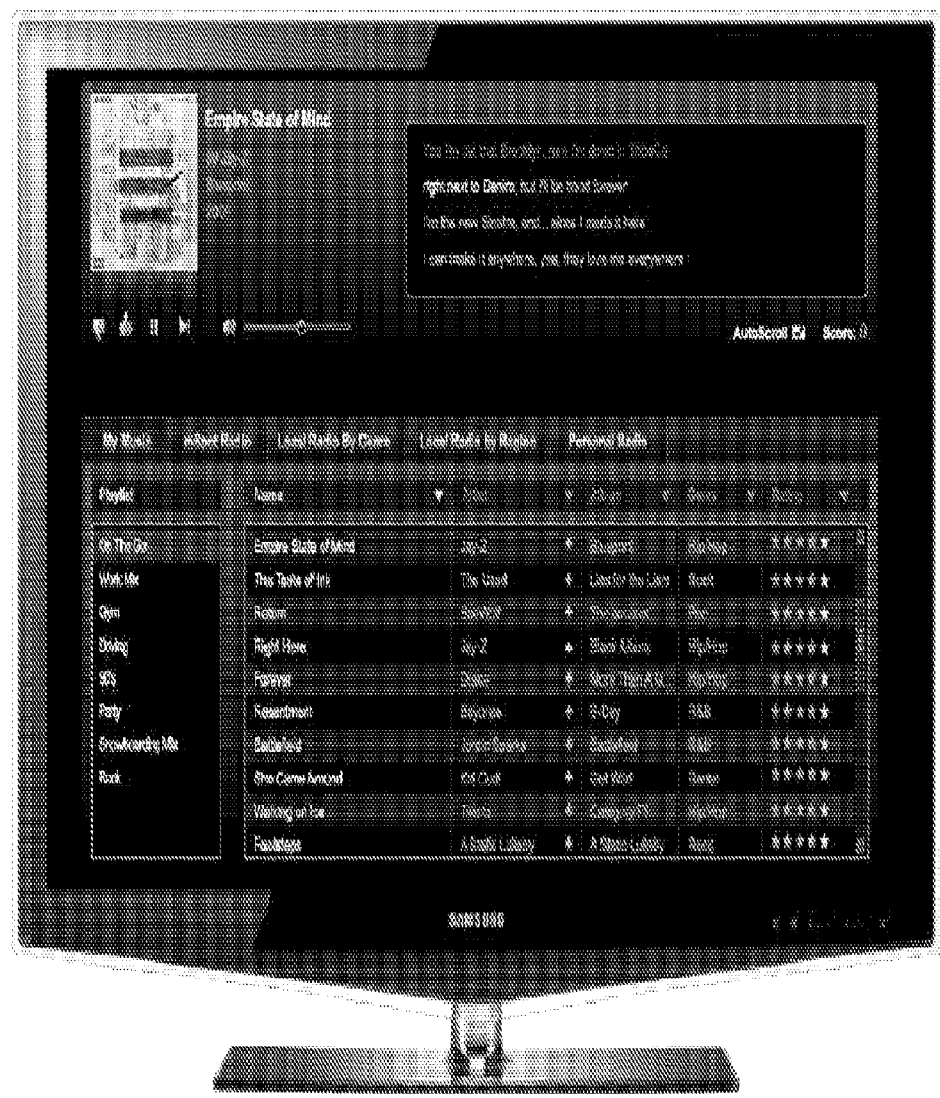
FIG. 13 illustrates an example of a television interface of the content system.
Figure 16A:
FIGS. 16A and 16B illustrate two examples of a user interface of the content system on a device.
Figure 16B:
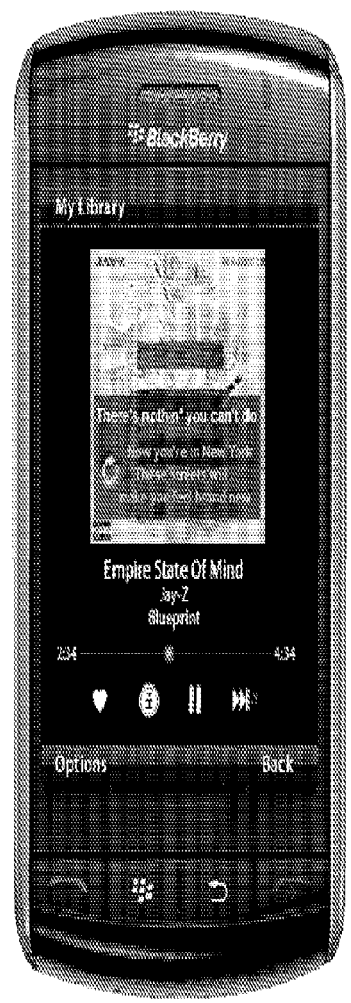
Figure 17:
FIG. 17 illustrate examples of a user interface of the content system on several different devices.

FIG. 13 illustrates an example of a television interface of the content system wherein the user can interact with the content system from an IP enabled television and thus interact with the digital content. FIGS. 16A and 16B illustrate two examples of a user interface of the content system on a device, such as a RIM Blackberry device. FIG. 16A shows synching of digital content occurring while FIG. 16B shows the user interface when a piece of digital content being played. Furthermore, FIG. 17 illustrate examples of a user interface of the content system on several different devices including the RIM Blackberry, Motorola Droid and the Apple iPhone.

Figure 18:
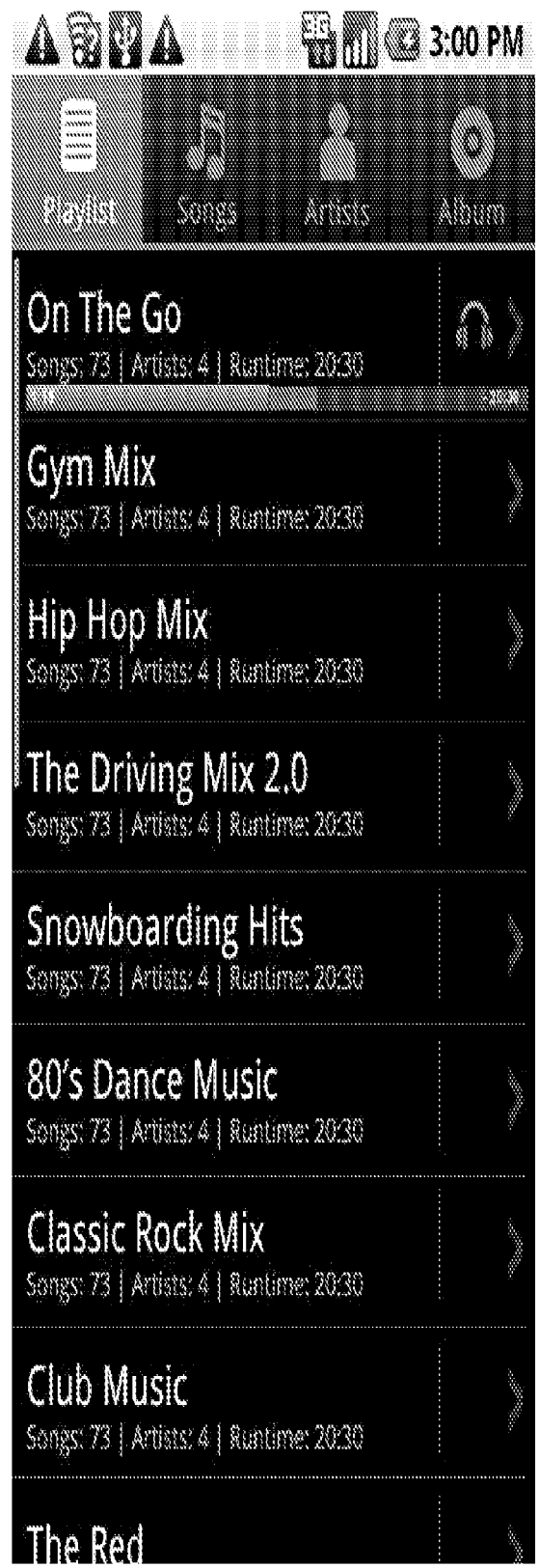
FIG. 18 illustrates an example of the user interface for songs/playlists available to a device.
Figure 19:
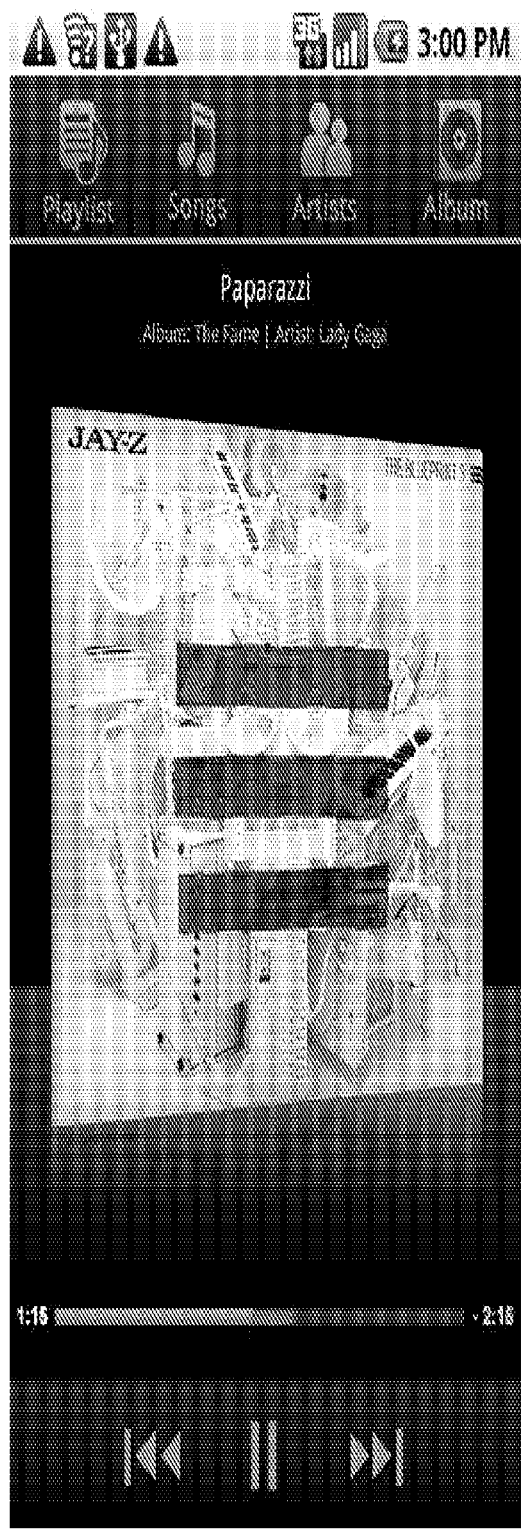
FIG. 19 illustrates an example of the user interface for a digital content player on a particular device.
Figure 20:
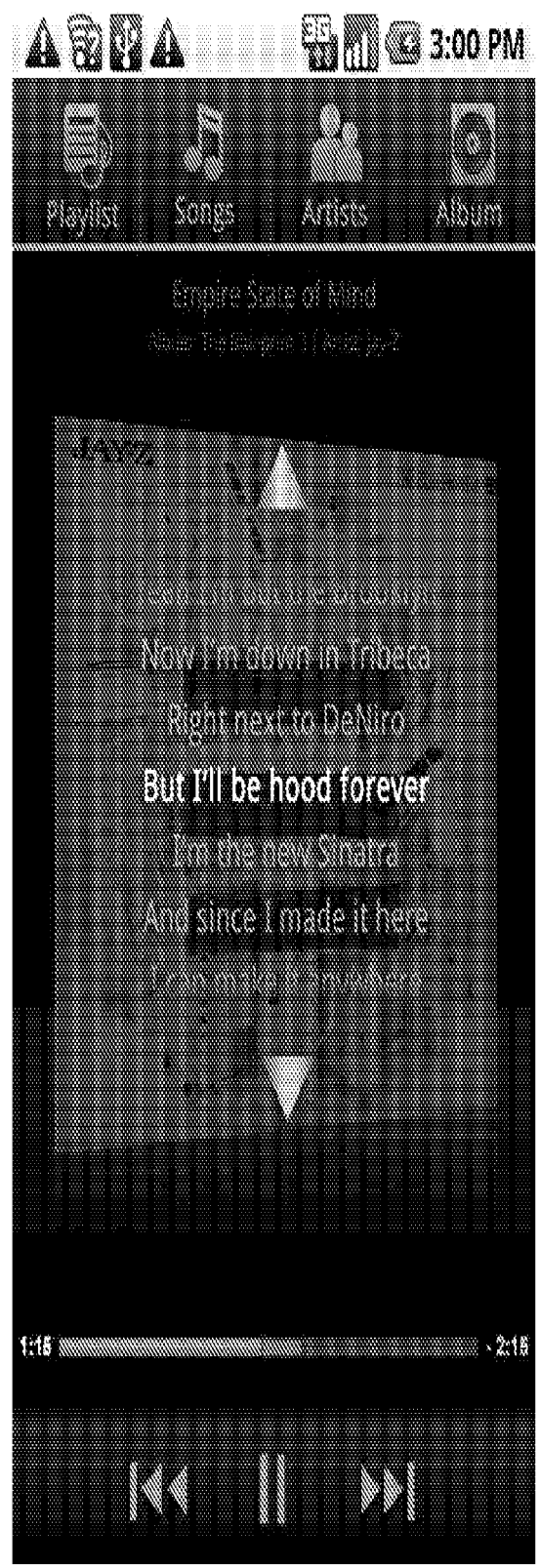
FIG. 20 illustrates an example of the lyric user interface for a digital content system on a particular device.

FIG. 18 illustrates an example of the user interface for songs/playlists available to a device 20 which allow a user of the device to request digital content (songs), playlists (shown in FIG. 18), artist playlists and album playlists from the digital content stored on the content system. Some of the digital content may be already stored on the device and the remainder can be downloaded wirelessly or over a USB cable as it is needed by the user. FIG. 19 illustrates an example of the user interface for a digital content player on a particular device that allows the user to control playback of the current playing digital content and have additional features specific to the digital content being played by the user. FIG. 20 illustrates an example of the lyric user interface for a digital content system on a particular device in which the user is viewing the lyrics as a song is being played by the user.

Figure 21:
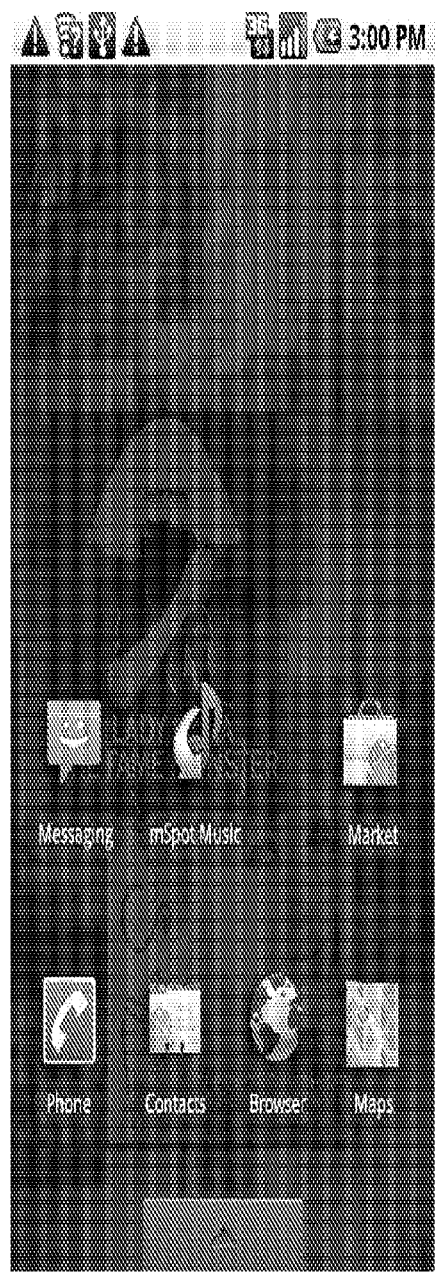
FIG. 21 illustrates an example of a live wallpaper function of a digital content system on a particular device.
Figure 22:
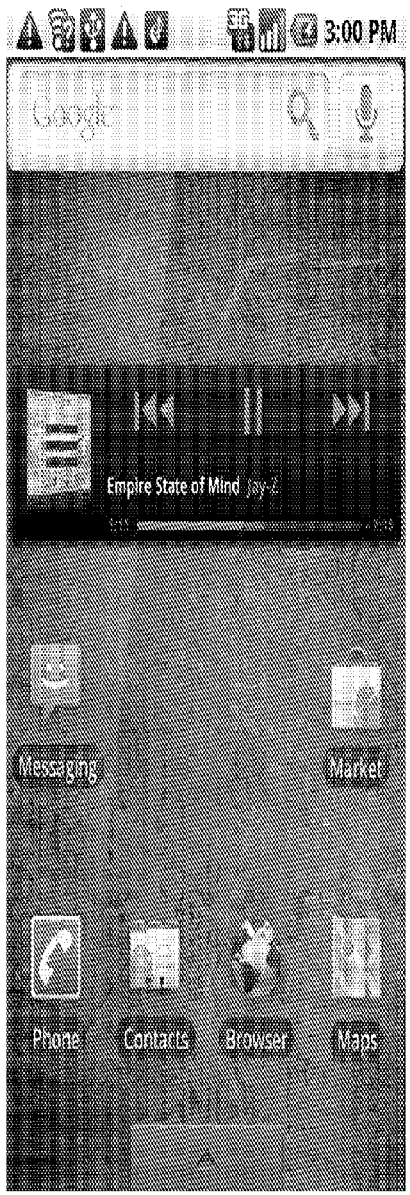
FIG. 22 illustrates an example of a desktop widget of a digital content system on a particular device.
Figure 23:
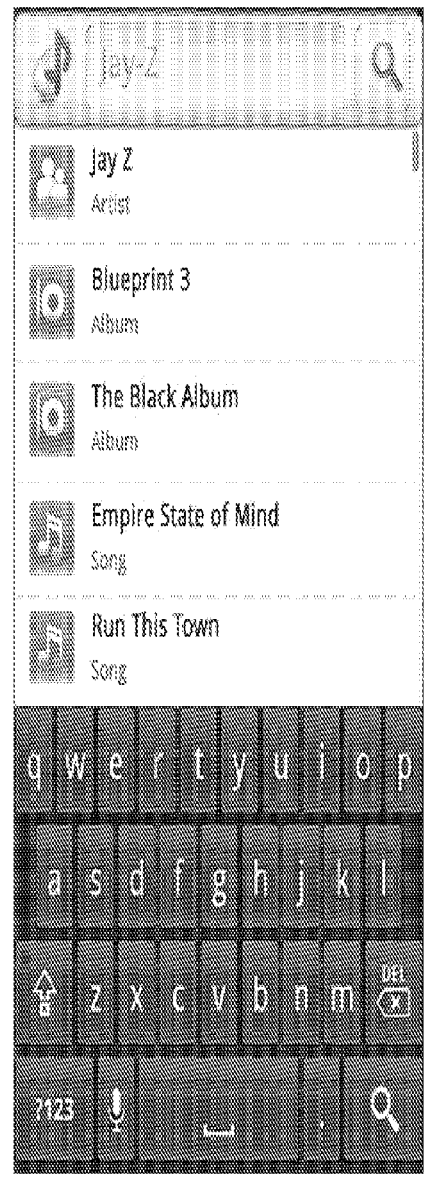
FIG. 23 illustrates an example of a quick search support function of a digital content system on a particular device.
Figure 24:
FIG. 24 illustrates an example of a docked playback client of the digital content system on a particular device.
Figure 25:
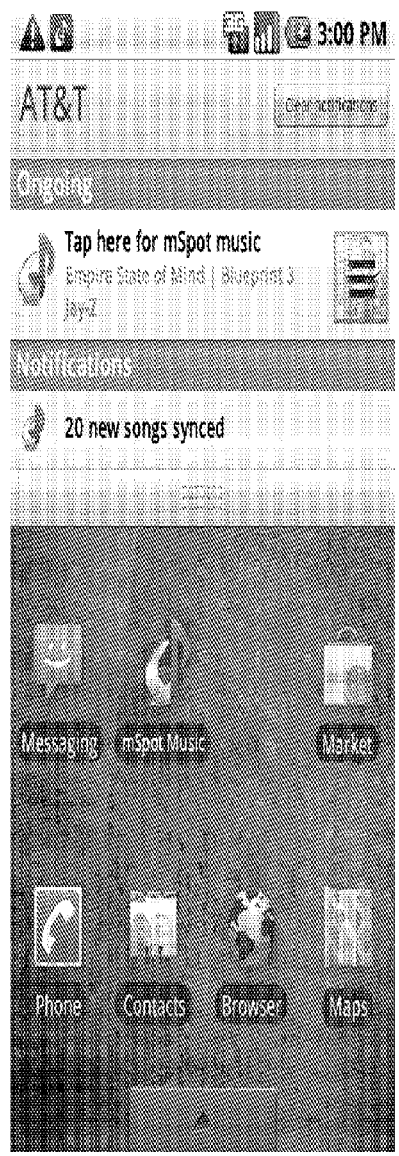
FIG. 25 illustrates an example of notification service integration of the digital content system on a particular device.

For certain devices 20, there may be some additional features of the content system. For example, the content system may enable live wallpaper (See FIG. 21 for example) in which the wallpaper may be cover art from the music in the content system. The background may be responsive to touch and change slowly when no music is playing and animate during song transitions. The certain devices may also have a desktop widget (See FIG. 22) that allows the user to control the playing of the digital content. Furthermore, the devices may integrate the content data into a quick search (See FIG. 23) to find pieces of digital content on the device or available on the computer/cloud. FIG. 24 illustrates an example of a docked playback client of the digital content system on a particular device wherein the user interface has a landscape layout. The device may also integrate the content system into a notification service (see FIG. 25 for example) in which the user has quick access to the current application as well as new/changed content on the computer/cloud.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computing cloud comprising:
a social networking system providing a social network having multiple users;
a content store configured to store interaction data for at least one user of the social network, wherein said interaction data relates to digital content that said at least one user interacted with; and
a recommendation engine configured to provide a recommendation for digital content to a first user of the social network based upon interaction data for said first user, interaction data for at least one other user of the social network, and correlation information for said first user, wherein said correlation information comprises a correlation between pieces of digital content included in a playlist of said first user.

2. The apparatus of claim 1, wherein:
interaction data for at least one user of the social network comprises digital fingerprints for audio content that said at least one user interacted with; and
a recommendation for digital content comprises a recommendation for audio content.

3. The apparatus of claim 1, wherein:
for at least one user of the social network, the content store is further configured to:
store at least one playlist of said at least one user, wherein each playlist comprises one or more pieces of digital content;
maintain different types of digital content of said at least one user; and
collect metadata generated by said at least one user interacting with digital content when said at least one user uploads digital content to the content store; and
the recommendation engine store is further configured to:
determine said correlation information for said first user based on at least one playlist of said first user, wherein said correlation information comprises one or more correlations between pieces of digital content included in said at least one playlist.

4. The apparatus of claim 1, wherein interaction data for at least one user of the social network comprises metadata collected from a plurality of devices operated by said at least one user.

5. A computing cloud comprising:
a social networking system providing one or more social networks, wherein each social network has multiple users;
a content store configured to store interaction data for at least one user of said one or more social networks, wherein said interaction data relates to digital content that said at least one user interacted with; and
a recommendation engine configured to provide a recommendation to a first user of a first social network of said one or more social networks to add a different user to the first social network, wherein the recommendation is based upon interaction data for said first user, interaction data for said different user, and correlation information for said first user, wherein said correlation information comprises a correlation between pieces of digital content included in a playlist of said first user.

6. The computing cloud of claim 5, wherein interaction data for at least one user of said one or more social networks comprises digital fingerprints for audio content that said at least one user interacted with.

7. The computing cloud of claim 5, wherein interaction data for at least one user of said one or more social networks comprises metadata collected from a plurality of devices operated by said at least one user.

8. The computing cloud of claim 5, wherein:
the recommendation engine store is further configured to:
determine said correlation information for said first user based on at least one playlist of said first user, wherein said correlation information comprises one or more correlations between pieces of digital content included in said at least one playlist.

9. The computing cloud of claim 5, wherein:
for at least one user of said one or more social networks, the content store is further configured to:
store at least one playlist of said at least one user, wherein each playlist comprises one or more pieces of digital content;
maintain different types of digital content of said at least one user; and
collect metadata generated by said at least one user interacting with digital content when said at least one user uploads digital content to the content store.

10. A method for generating a recommendation, comprising:
storing interaction data for at least one user of a social network, wherein said interaction data relates to digital content that said at least one user interacted with; and
providing a recommendation for digital content to a first user of the social network based upon interaction data for said first user, interaction data for at least one other user of the social network, and correlation information for said first user, wherein said correlation information comprises a correlation between pieces of digital content included in a playlist of said first user.

11. The method of claim 10, wherein:
interaction data for at least one user of the social network comprises digital fingerprints for audio content that said at least one user interacted with; and
a recommendation for digital content comprises a recommendation for audio content.

12. The method of claim 10, further comprising:
obtaining social network information for said first user;
identifying said one or more other users of the social network based upon the social network information for said first user;
for at least one user of the social network:
storing at least one playlist of said at least one user, wherein each playlist comprises one or more pieces of digital content;
maintaining different types of digital content of said at least one user; and
collecting metadata generated by said at least one user interacting with digital content when said at least one user uploads digital content to the social network; and determining said correlation information for said first user based on at least one playlist of said first user, wherein said correlation information comprises one or more correlations between pieces of digital content included in said at least one playlist.

13. The method of claim 10, wherein interaction data for at least one user of the social network comprises metadata collected from a plurality of devices operated by said at least one user.

14. A method for generating a recommendation, comprising:
   storing interaction data for at least one user of said one or more social networks, wherein said interaction data relates to digital content that said at least one user interacted with; and
   providing a recommendation to a first user of a first social network of said one or more social networks to add a different user to the first social network, wherein the recommendation is based upon interaction data for said first user, interaction data for said different user, and correlation information for said first user, wherein said correlation information comprises a correlation between pieces of digital content included in a playlist of said first user.

15. The method of claim 14, wherein interaction data for at least one user of said one or more social networks comprises digital fingerprints for audio content that said at least one user interacted with.

16. The method of claim 14, wherein interaction data for at least one user of said one or more social networks comprises metadata collected from a plurality of devices operated by said at least one user.

17. The method of claim 14, further comprising:
   obtaining social network information for said first user; and
   identifying said one or more other users of the social network based upon the social network information for said first user.

18. The method of claim 14, further comprising:
   for at least one user of the social network:
      storing at least one playlist of said at least one user, wherein each playlist comprises one or more pieces of digital content;
      maintaining different types of digital content of said at least one user; and
      obtaining metadata generated by said at least one user interacting with digital content when said at least one user uploads digital content to said one or more social networks; and
   determining said correlation information for said first user based on at least one playlist of said first user, wherein said correlation information comprises one or more correlations between pieces of digital content included in said at least one playlist.

19. The method of claim 14, wherein interacting with digital content comprises listening to audio content on a mobile device.

20. The method of claim 19, wherein the audio content comprises a song.

* * * * *